US008597397B2

(12) United States Patent
Kunze et al.

(10) Patent No.: US 8,597,397 B2
(45) Date of Patent: *Dec. 3, 2013

(54) PRODUCTION OF METAL NANOPARTICLES

(75) Inventors: Klaus Kunze, Manchester, NM (US); Hyungrak Kim, Albuquerque, NM (US); Allen B. Schult, Albuquerque, NM (US); Nathan E. Stott, Suwon-shi (KR); Andrew M. Argo, Lakewood, CO (US)

(73) Assignee: Cabot Corporation, Boston, MA (US)

(*) Notice: Subject to any disclaimer, the term of this patent is extended or adjusted under 35 U.S.C. 154(b) by 276 days.

This patent is subject to a terminal disclaimer.

(21) Appl. No.: 12/829,934

(22) Filed: Jul. 2, 2010

(65) Prior Publication Data
US 2010/0269635 A1 Oct. 28, 2010

Related U.S. Application Data

(63) Continuation of application No. 11/755,720, filed on May 30, 2007, now Pat. No. 7,824,466, which is a continuation-in-part of application No. 11/331,230, filed on Jan. 13, 2006, now Pat. No. 7,749,299.

(60) Provisional application No. 60/643,577, filed on Jan. 14, 2005, provisional application No. 60/643,629, filed on Jan. 14, 2005, provisional application No. 60/643,578, filed on Jan. 14, 2005.

(51) Int. Cl.
*B22F 9/24* (2006.01)
*B82Y 40/00* (2011.01)

(52) U.S. Cl.
USPC .................. 75/362; 75/371; 977/896

(58) Field of Classification Search
None
See application file for complete search history.

(56) References Cited

U.S. PATENT DOCUMENTS

| 2,785,964 A | 3/1957 | Pollock |
| 3,313,632 A | 4/1967 | Langley et al. |
| 3,401,020 A | 9/1968 | Kester et al. |
| 3,683,382 A | 8/1972 | Ballinger |

(Continued)

FOREIGN PATENT DOCUMENTS

| EP | 0 410 765 A3 | 7/1990 |
| EP | 0 449 309 B9 | 3/1991 |

(Continued)

OTHER PUBLICATIONS

"Large-Scale Synthesis of Uniform Silver Nanowires Through a Soft, Self-Seeding, Polyol Process"; Advanced Materials; vol. 14, No. 11; (2002).

(Continued)

*Primary Examiner* — George Wyszomierski

(57) ABSTRACT

Processes for the production of metal nanoparticles. In one aspect, the invention is to a process comprising the steps of mixing a heated first solution comprising a base and/or a reducing agent (e.g., a non-polyol reducing agent), a polyol, and a polymer of vinyl pyrrolidone with a second solution comprising a metal precursor that is capable of being reduced to a metal by the polyol. In another aspect, the invention is to a process that includes the steps of heating a powder of a polymer of vinyl pyrrolidone; forming a first solution comprising the powder and a polyol; and mixing the first solution with a second solution comprising a metal precursor capable of being reduced to a metal by the polyol.

72 Claims, 2 Drawing Sheets

(56) References Cited

U.S. PATENT DOCUMENTS

| | | |
|---|---|---|
| 3,814,696 A | 6/1974 | Verdone et al. |
| 3,922,355 A | 11/1975 | Kotthoff |
| 3,922,388 A | 11/1975 | Schebalin |
| 3,957,694 A | 5/1976 | Bolon et al. |
| RE28,972 E | 9/1976 | Weber et al. |
| 4,019,188 A | 4/1977 | Hochberg et al. |
| 4,051,074 A | 9/1977 | Asada |
| 4,105,483 A | 8/1978 | Lin |
| 4,122,062 A | 10/1978 | Monte et al. |
| 4,130,671 A | 12/1978 | Nagesh et al. |
| 4,170,480 A | 10/1979 | Ikenoue et al. |
| 4,186,244 A | 1/1980 | Deffeyes et al. |
| 4,211,668 A | 7/1980 | Tate |
| 4,255,291 A | 3/1981 | Needes et al. |
| 4,266,229 A | 5/1981 | Mansukhani |
| 4,289,534 A | 9/1981 | Deffeyes et al. |
| 4,333,966 A | 6/1982 | Deffeyes et al. |
| 4,370,308 A | 1/1983 | Williams et al. |
| 4,381,945 A | 5/1983 | Nair |
| 4,388,346 A | 6/1983 | Bickler |
| 4,407,674 A | 10/1983 | Ehrreich |
| 4,416,932 A | 11/1983 | Nair |
| 4,418,099 A | 11/1983 | Cuevas et al. |
| 4,419,383 A | 12/1983 | Lee |
| 4,463,030 A | 7/1984 | Deffeyes et al. |
| 4,487,811 A | 12/1984 | Eichelberger et al. |
| 4,508,753 A | 4/1985 | Stepan |
| 4,517,252 A | 5/1985 | Hugh |
| 4,539,041 A | 9/1985 | Figlarz et al. |
| 4,548,879 A | 10/1985 | St. John et al. |
| 4,594,311 A | 6/1986 | Frisch et al. |
| 4,599,277 A | 7/1986 | Brownlow et al. |
| 4,622,069 A | 11/1986 | Akai et al. |
| 4,627,875 A | 12/1986 | Kobayashi et al. |
| 4,650,108 A | 3/1987 | Gallagher |
| 4,668,533 A | 5/1987 | Miller |
| 4,697,041 A | 9/1987 | Okaniwa et al. |
| 4,720,418 A | 1/1988 | Kuo |
| 4,746,838 A | 5/1988 | Kay |
| 4,753,821 A | 6/1988 | Giesecke et al. |
| 4,775,439 A | 10/1988 | Seeger, Jr. et al. |
| 4,808,274 A | 2/1989 | Nguyen |
| 4,857,241 A | 8/1989 | Straw et al. |
| 4,859,241 A | 8/1989 | Grundy |
| 4,877,451 A | 10/1989 | Winnik et al. |
| 4,877,647 A | 10/1989 | Klabunde |
| 4,879,104 A | 11/1989 | List et al. |
| 4,891,242 A | 1/1990 | Ito et al. |
| 4,892,798 A | 1/1990 | Lamanna et al. |
| 4,931,168 A | 6/1990 | Watanabe et al. |
| 4,931,323 A | 6/1990 | Manitt et al. |
| 4,948,623 A | 8/1990 | Beach et al. |
| 4,959,430 A | 9/1990 | Jonas et al. |
| 5,011,627 A | 4/1991 | Lutz et al. |
| 5,028,473 A | 7/1991 | Vitriol et al. |
| 5,039,552 A | 8/1991 | Riemer |
| 5,045,141 A | 9/1991 | Salensky et al. |
| 5,049,434 A | 9/1991 | Wasulko |
| 5,057,363 A | 10/1991 | Nakanishi |
| 5,059,242 A | 10/1991 | Firmstone et al. |
| 5,075,262 A | 12/1991 | Nguyen et al. |
| 5,091,003 A | 2/1992 | Boaz |
| 5,121,127 A | 6/1992 | Toriyama |
| 5,132,248 A | 7/1992 | Drummond et al. |
| 5,139,818 A | 8/1992 | Mance |
| 5,148,355 A | 9/1992 | Lowe et al. |
| 5,153,023 A | 10/1992 | Orlowski et al. |
| 5,160,366 A | 11/1992 | Shibata |
| 5,173,330 A | 12/1992 | Asano et al. |
| 5,176,744 A | 1/1993 | Muller |
| 5,176,764 A | 1/1993 | Abbott et al. |
| 5,183,784 A | 2/1993 | Nguyen et al. |
| 5,215,820 A | 6/1993 | Hosokawa et al. |
| 5,216,207 A | 6/1993 | Prabhu et al. |
| 5,244,538 A | 9/1993 | Kumar |
| 5,250,229 A | 10/1993 | Hara et al. |
| 5,270,368 A | 12/1993 | Lent et al. |
| 5,281,261 A | 1/1994 | Lin |
| 5,312,480 A | 5/1994 | Lotze et al. |
| 5,312,674 A | 5/1994 | Haertling et al. |
| 5,329,293 A | 7/1994 | Liker |
| 5,332,646 A | 7/1994 | Wright et al. |
| 5,366,760 A | 11/1994 | Fujii et al. |
| 5,378,408 A | 1/1995 | Carroll et al. |
| 5,378,508 A | 1/1995 | Castro et al. |
| 5,384,953 A | 1/1995 | Economikos et al. |
| 5,395,452 A | 3/1995 | Kobayashi et al. |
| 5,403,375 A | 4/1995 | Konig et al. |
| 5,421,926 A | 6/1995 | Yokonobu et al. |
| 5,433,893 A | 7/1995 | Jost et al. |
| 5,444,453 A | 8/1995 | Lalezari et al. |
| 5,463,057 A | 10/1995 | Graetzel et al. |
| 5,494,550 A | 2/1996 | Benge |
| 5,501,150 A | 3/1996 | Leenders et al. |
| 5,539,041 A | 7/1996 | Arnold et al. |
| 5,559,057 A | 9/1996 | Goldstein |
| 5,565,143 A | 10/1996 | Chan |
| 5,571,311 A | 11/1996 | Belmont et al. |
| 5,587,111 A | 12/1996 | Watanabe et al. |
| 5,599,046 A | 2/1997 | Behm et al. |
| 5,601,638 A | 2/1997 | Fukuda et al. |
| 5,604,027 A | 2/1997 | Sheridon |
| 5,604,673 A | 2/1997 | Washburn et al. |
| 5,645,932 A | 7/1997 | Uchibori |
| 5,665,472 A | 9/1997 | Tanaka et al. |
| 5,679,724 A | 10/1997 | Sacripante et al. |
| 5,712,673 A | 1/1998 | Hayashi et al. |
| 5,716,663 A | 2/1998 | Capote et al. |
| 5,725,647 A | 3/1998 | Carlson et al. |
| 5,725,672 A | 3/1998 | Schmitt et al. |
| 5,746,868 A | 5/1998 | Abe |
| 5,747,222 A | 5/1998 | Ryu |
| 5,747,562 A | 5/1998 | Mahmud et al. |
| 5,750,194 A | 5/1998 | Watanabe et al. |
| 5,751,325 A | 5/1998 | Leenders et al. |
| 5,759,230 A | 6/1998 | Chow et al. |
| 5,759,712 A | 6/1998 | Hockaday |
| 5,767,810 A | 6/1998 | Hagiwara et al. |
| 5,781,158 A | 7/1998 | Ko et al. |
| 5,801,108 A | 9/1998 | Huang et al. |
| 5,814,683 A | 9/1998 | Branham |
| 5,826,329 A | 10/1998 | Roth |
| 5,828,271 A | 10/1998 | Stitzer |
| 5,837,041 A | 11/1998 | Bean et al. |
| 5,837,045 A | 11/1998 | Johnson et al. |
| 5,838,271 A | 11/1998 | Park |
| 5,838,567 A | 11/1998 | Boggio, Jr. |
| 5,846,615 A | 12/1998 | Sharma et al. |
| 5,853,470 A | 12/1998 | Martin et al. |
| 5,879,715 A | 3/1999 | Higgins et al. |
| 5,882,722 A | 3/1999 | Kydd |
| 5,894,038 A | 4/1999 | Sharma et al. |
| 5,909,083 A | 6/1999 | Asano et al. |
| 5,930,026 A | 7/1999 | Jacobson et al. |
| 5,932,280 A | 8/1999 | Roth |
| 5,953,037 A | 9/1999 | Hayashi et al. |
| 5,962,085 A | 10/1999 | Hayashi et al. |
| 5,966,580 A | 10/1999 | Watanabe et al. |
| 5,992,320 A | 11/1999 | Kosaka et al. |
| 5,997,044 A | 12/1999 | Behm et al. |
| 5,998,085 A | 12/1999 | Isberg et al. |
| 6,019,926 A | 2/2000 | Southward et al. |
| 6,025,026 A | 2/2000 | Smith et al. |
| 6,027,762 A | 2/2000 | Tomita et al. |
| 6,036,889 A | 3/2000 | Kydd |
| 6,042,643 A | 3/2000 | Belmont et al. |
| 6,074,725 A | 6/2000 | Kennedy |
| 6,080,261 A | 6/2000 | Popat et al. |
| 6,080,928 A | 6/2000 | Nakagawa |
| 6,099,897 A | 8/2000 | Sayo et al. |
| 6,103,393 A | 8/2000 | Kodas et al. |
| 6,103,868 A | 8/2000 | Heath et al. |
| 6,109,175 A | 8/2000 | Kinoshita |
| 6,118,426 A | 9/2000 | Albert et al. |

(56) References Cited

U.S. PATENT DOCUMENTS

| | | |
|---|---|---|
| 6,124,851 A | 9/2000 | Jacobson |
| 6,133,147 A | 10/2000 | Rhee et al. |
| 6,143,356 A | 11/2000 | Jablonski |
| 6,153,348 A | 11/2000 | Kydd et al. |
| 6,156,837 A | 12/2000 | Branan, Jr. et al. |
| 6,159,267 A | 12/2000 | Hampden-Smith et al. |
| 6,165,247 A | 12/2000 | Kodas et al. |
| 6,169,129 B1 | 1/2001 | Mahmud et al. |
| 6,169,837 B1 | 1/2001 | Kato et al. |
| 6,177,151 B1 | 1/2001 | Chrisey et al. |
| 6,184,457 B1 | 2/2001 | Tsuzuki et al. |
| 6,190,731 B1 | 2/2001 | Tecle |
| 6,197,147 B1 | 3/2001 | Bonsel et al. |
| 6,197,366 B1 | 3/2001 | Takamatsu |
| 6,200,405 B1 | 3/2001 | Nakazawa et al. |
| 6,207,268 B1 | 3/2001 | Kosaka et al. |
| 6,214,259 B1 | 4/2001 | Oda et al. |
| 6,214,520 B1 | 4/2001 | Wolk et al. |
| 6,238,734 B1 | 5/2001 | Senzaki et al. |
| 6,245,494 B1 | 6/2001 | Andriessen et al. |
| 6,251,471 B1 | 6/2001 | Granoff et al. |
| 6,251,488 B1 | 6/2001 | Miller et al. |
| 6,268,014 B1 | 7/2001 | Eberspacher et al. |
| 6,270,389 B1 | 8/2001 | Kobayashi et al. |
| 6,274,412 B1 | 8/2001 | Kydd et al. |
| 6,277,169 B1 | 8/2001 | Hampden-Smith et al. |
| 6,277,740 B1 | 8/2001 | Goldstein |
| 6,294,401 B1 | 9/2001 | Jacobson et al. |
| 6,296,896 B1 | 10/2001 | Takahashi et al. |
| 6,316,100 B1 | 11/2001 | Kodas et al. |
| 6,317,023 B1 | 11/2001 | Felten |
| 6,323,096 B1 | 11/2001 | Saia et al. |
| 6,328,894 B1 | 12/2001 | Chan et al. |
| 6,329,899 B1 | 12/2001 | Hunt et al. |
| RE37,512 E | 1/2002 | Szlufcik et al. |
| 6,338,809 B1 | 1/2002 | Hampden-Smith et al. |
| 6,348,295 B1 | 2/2002 | Griffith et al. |
| 6,356,234 B1 | 3/2002 | Harrison et al. |
| 6,358,567 B2 | 3/2002 | Pham et al. |
| 6,358,611 B1 | 3/2002 | Nagasawa et al. |
| 6,368,378 B2 | 4/2002 | Sasaki |
| 6,372,158 B1 | 4/2002 | Hashimoto et al. |
| 6,379,742 B1 | 4/2002 | Behm et al. |
| 6,379,745 B1 | 4/2002 | Kydd et al. |
| 6,380,778 B2 | 4/2002 | Uehara et al. |
| 6,395,053 B1 | 5/2002 | Fau et al. |
| 6,399,230 B1 | 6/2002 | Tormey et al. |
| 6,413,790 B1 | 7/2002 | Duthaler et al. |
| 6,416,150 B1 | 7/2002 | Kimura |
| 6,458,327 B1 | 10/2002 | Vossmeyer |
| 6,458,431 B2 | 10/2002 | Hill et al. |
| 6,467,897 B1 | 10/2002 | Wu et al. |
| 6,487,774 B1 | 12/2002 | Nakao et al. |
| 6,501,663 B1 | 12/2002 | Pan |
| 6,503,831 B2 | 1/2003 | Speakman |
| 6,506,438 B2 | 1/2003 | Duthaler et al. |
| 6,537,359 B1 | 3/2003 | Spa |
| 6,541,433 B2 | 4/2003 | Schultz et al. |
| 6,548,036 B2 | 4/2003 | Iida et al. |
| 6,599,631 B2 | 7/2003 | Kambe et al. |
| 6,603,038 B1 | 8/2003 | Hagemeyer et al. |
| 6,645,569 B2 | 11/2003 | Cramer et al. |
| 6,649,138 B2 | 11/2003 | Adams et al. |
| 6,660,058 B1 | 12/2003 | Oh et al. |
| 6,660,680 B1 | 12/2003 | Hampden-Smith |
| 6,667,360 B1 | 12/2003 | Ng et al. |
| 6,697,694 B2 | 2/2004 | Mogensen |
| 6,713,389 B2 | 3/2004 | Speakman |
| 6,730,400 B2 | 5/2004 | Komatsu et al. |
| 6,743,319 B2 | 6/2004 | Kydd |
| 6,753,108 B1 | 6/2004 | Hampden-Smith et al. |
| 6,773,614 B2 | 8/2004 | Field |
| 6,774,036 B2 | 8/2004 | Goldstein |
| 6,780,765 B2 | 8/2004 | Goldstein |
| 6,811,885 B1 | 11/2004 | Andriessen et al. |
| 6,814,795 B2 | 11/2004 | McVicker et al. |
| 6,827,772 B2 | 12/2004 | Foster |
| 6,830,778 B1 | 12/2004 | Schulz et al. |
| 6,855,196 B2 | 2/2005 | Kawamura et al. |
| 6,880,909 B2 | 4/2005 | King et al. |
| 6,881,239 B2 | 4/2005 | Uchida |
| 6,939,576 B2 | 9/2005 | Deshpande et al. |
| 6,951,666 B2 | 10/2005 | Kodas et al. |
| 6,958,095 B2 | 10/2005 | Kakimoto et al. |
| 7,115,218 B2 | 10/2006 | Kydd et al. |
| 7,533,361 B2 | 5/2009 | Edwards |
| 7,553,512 B2 | 6/2009 | Kodas et al. |
| 7,575,621 B2 | 8/2009 | Vanheusden et al. |
| 7,585,349 B2 | 9/2009 | Xia et al. |
| 7,597,769 B2 | 10/2009 | Hampden-Smith et al. |
| 7,625,420 B1 | 12/2009 | Kodas et al. |
| 7,629,017 B2 | 12/2009 | Kodas et al. |
| 7,824,466 B2 * | 11/2010 | Vanheusden et al. ........... 75/362 |
| 2001/0004477 A1 | 6/2001 | Fukunaga et al. |
| 2001/0017085 A1 | 8/2001 | Kubo |
| 2002/0006723 A1 | 1/2002 | Goldstein |
| 2002/0018861 A1 | 2/2002 | Hill et al. |
| 2002/0020491 A1 | 2/2002 | Price et al. |
| 2002/0058143 A1 | 5/2002 | Hunt et al. |
| 2002/0079832 A1 | 6/2002 | Van Tongeren et al. |
| 2002/0131254 A1 | 9/2002 | Schaper |
| 2002/0146564 A1 | 10/2002 | Takai et al. |
| 2002/0148640 A1 | 10/2002 | Holl et al. |
| 2002/0150678 A1 | 10/2002 | Cramer et al. |
| 2002/0151161 A1 | 10/2002 | Furusawa |
| 2002/0176987 A1 | 11/2002 | Yadav et al. |
| 2003/0003231 A1 | 1/2003 | Kiguchi et al. |
| 2003/0009726 A1 | 1/2003 | Chang et al. |
| 2003/0020768 A1 | 1/2003 | Renn |
| 2003/0060038 A1 | 3/2003 | Sirringhaus et al. |
| 2003/0063155 A1 | 4/2003 | Nakao et al. |
| 2003/0070569 A1 | 4/2003 | Bulthaup et al. |
| 2003/0070747 A1 | 4/2003 | Kydd |
| 2003/0073042 A1 | 4/2003 | Cernigliaro et al. |
| 2003/0082485 A1 | 5/2003 | Bulthaup et al. |
| 2003/0083203 A1 | 5/2003 | Hashimoto |
| 2003/0085057 A1 | 5/2003 | Hashimoto |
| 2003/0096056 A1 | 5/2003 | Kawamura et al. |
| 2003/0102099 A1 | 6/2003 | Yadav et al. |
| 2003/0108664 A1 | 6/2003 | Kodas et al. |
| 2003/0110978 A1 | 6/2003 | Abe et al. |
| 2003/0116057 A1 | 6/2003 | Suzuki et al. |
| 2003/0123259 A1 | 7/2003 | Furuya et al. |
| 2003/0124259 A1 | 7/2003 | Kodas et al. |
| 2003/0145680 A1 | 8/2003 | Ichida |
| 2003/0146019 A1 | 8/2003 | Hirai |
| 2003/0148024 A1 | 8/2003 | Kodas et al. |
| 2003/0151030 A1 | 8/2003 | Gurin |
| 2003/0161959 A1 | 8/2003 | Kodas et al. |
| 2003/0168639 A1 | 9/2003 | Cheon et al. |
| 2003/0175411 A1 | 9/2003 | Kodas et al. |
| 2003/0180451 A1 | 9/2003 | Kodas et al. |
| 2003/0183165 A1 | 10/2003 | Kakimoto et al. |
| 2003/0185739 A1 | 10/2003 | Mangold et al. |
| 2003/0185889 A1 | 10/2003 | Yan et al. |
| 2003/0201244 A1 | 10/2003 | Ogawa et al. |
| 2003/0207949 A1 | 11/2003 | Klabunde et al. |
| 2003/0211246 A1 | 11/2003 | Kydd et al. |
| 2003/0213614 A1 | 11/2003 | Furusawa et al. |
| 2003/0215565 A1 | 11/2003 | Chang et al. |
| 2003/0224104 A1 | 12/2003 | Fukunaga |
| 2003/0228748 A1 | 12/2003 | Nelson et al. |
| 2004/0004209 A1 | 1/2004 | Matsuba et al. |
| 2004/0030019 A1 | 2/2004 | Kim et al. |
| 2004/0038808 A1 | 2/2004 | Hampden-Smith |
| 2004/0043691 A1 | 3/2004 | Abe et al. |
| 2004/0046154 A1 | 3/2004 | McVicker et al. |
| 2004/0058457 A1 | 3/2004 | Huang et al. |
| 2004/0074336 A1 | 4/2004 | Daimon et al. |
| 2004/0126708 A1 | 7/2004 | Jing et al. |
| 2004/0131538 A1 | 7/2004 | Ohzeki |
| 2004/0140549 A1 | 7/2004 | Miyagawa |
| 2004/0142165 A1 | 7/2004 | Fujii |
| 2004/0144958 A1 | 7/2004 | Conaghan et al. |

(56) References Cited

U.S. PATENT DOCUMENTS

| | | | |
|---|---|---|---|
| 2004/0144959 | A1 | 7/2004 | Conaghan et al. |
| 2004/0145858 | A1 | 7/2004 | Sakurada |
| 2004/0151893 | A1 | 8/2004 | Kydd et al. |
| 2004/0160465 | A1 | 8/2004 | Baker-Smith et al. |
| 2004/0173144 | A1 | 9/2004 | Edwards et al. |
| 2004/0182533 | A1 | 9/2004 | Blum et al. |
| 2004/0191695 | A1 | 9/2004 | Ray et al. |
| 2004/0196329 | A1 | 10/2004 | Ready |
| 2004/0201648 | A1 | 10/2004 | Sekiya |
| 2004/0206941 | A1 | 10/2004 | Gurin |
| 2004/0223926 | A1 | 11/2004 | Kobayashi |
| 2004/0231594 | A1 | 11/2004 | Edwards et al. |
| 2004/0239730 | A1 | 12/2004 | Kurosawa |
| 2004/0247842 | A1 | 12/2004 | Koyama et al. |
| 2004/0250750 | A1 | 12/2004 | Reda et al. |
| 2004/0261700 | A1 | 12/2004 | Edwards |
| 2004/0263564 | A1 | 12/2004 | Mackawa |
| 2004/0265549 | A1 | 12/2004 | Kydd |
| 2005/0037614 | A1 | 2/2005 | Fukuchi |
| 2005/0056118 | A1 | 3/2005 | Xia et al. |
| 2005/0078158 | A1 | 4/2005 | Magdassi et al. |
| 2005/0116203 | A1 | 6/2005 | Takahashi et al. |
| 2005/0207930 | A1 | 9/2005 | Yamaguchi |
| 2005/0235776 | A1 | 10/2005 | He et al. |
| 2005/0238804 | A1 | 10/2005 | Garbar |
| 2006/0001726 | A1 | 1/2006 | Kodas et al. |
| 2006/0047014 | A1 | 3/2006 | Hopper et al. |
| 2006/0083694 | A1 | 4/2006 | Kodas et al. |
| 2006/0115536 | A1 | 6/2006 | Yacaman et al. |
| 2006/0158470 | A1 | 7/2006 | Vanheusden et al. |
| 2006/0158497 | A1 | 7/2006 | Vanheusden et al. |
| 2006/0159603 | A1 | 7/2006 | Vanheusden et al. |
| 2006/0159838 | A1 | 7/2006 | Kowalski et al. |
| 2006/0159899 | A1 | 7/2006 | Edwards et al. |
| 2006/0160373 | A1 | 7/2006 | Kowalski et al. |
| 2006/0162497 | A1 | 7/2006 | Kodas et al. |
| 2006/0163744 | A1 | 7/2006 | Vanheusden et al. |
| 2006/0165898 | A1 | 7/2006 | Kodas et al. |
| 2006/0165910 | A1 | 7/2006 | Kodas et al. |
| 2006/0166057 | A1 | 7/2006 | Kodas et al. |
| 2006/0176350 | A1 | 8/2006 | Howarth et al. |
| 2006/0189113 | A1 | 8/2006 | Vanheusden et al. |
| 2006/0235087 | A1 | 10/2006 | Alexandridis et al. |
| 2007/0034052 | A1 | 2/2007 | Vanheusden et al. |
| 2007/0056402 | A1 | 3/2007 | Cho et al. |
| 2007/0180954 | A1 | 8/2007 | Kim et al. |
| 2007/0190298 | A1 | 8/2007 | Hampden-Smith et al. |
| 2008/0087137 | A1 | 4/2008 | Shim et al. |
| 2009/0053400 | A1 | 2/2009 | La Vega et al. |

FOREIGN PATENT DOCUMENTS

| | | |
|---|---|---|
| EP | 0 537 502 B1 | 9/1992 |
| EP | 0 641 670 B1 | 8/1994 |
| EP | 0 696 515 B1 | 5/1995 |
| EP | 0 824 138 A2 | 7/1997 |
| EP | 0 930 641 A3 | 1/1999 |
| EP | 0 995 718 B1 | 9/1999 |
| EP | 0 977 212 A2 | 2/2000 |
| EP | 0 982 090 A1 | 3/2000 |
| EP | 1 083 578 A1 | 3/2001 |
| EP | 1 107 298 A2 | 6/2001 |
| EP | 1 339 073 A1 | 9/2001 |
| EP | 1 302 895 A3 | 4/2002 |
| EP | 1 335 393 A1 | 4/2002 |
| EP | 1 426 978 A1 | 8/2002 |
| EP | 1 493 780 A1 | 4/2003 |
| EP | 1 323 793 A1 | 7/2003 |
| EP | 1 340 568 A1 | 9/2003 |
| EP | 1 342 760 A1 | 9/2003 |
| EP | 1 544 905 A1 | 9/2003 |
| EP | 1 571 186 A1 | 2/2005 |
| EP | 1 515 348 A2 | 3/2005 |
| EP | 1801890 | 3/2010 |
| EP | 2270872 | 5/2011 |
| JP | 62-113164 | 5/1987 |
| JP | 01-303787 | 7/1989 |
| JP | 2002-124016 | 5/1990 |
| JP | 2000-011875 | 1/2000 |
| JP | 2000-182889 | 6/2000 |
| JP | 2001-167633 | 6/2001 |
| JP | 2004-311725 | 4/2004 |
| JP | 2004235272 | 8/2004 |
| JP | 2005-191059 | 7/2005 |
| JP | 2005-219873 | 8/2005 |
| WO | WO 89/05567 A1 | 6/1989 |
| WO | WO 97/48257 A1 | 12/1997 |
| WO | WO 98/08362 A1 | 2/1998 |
| WO | WO 98/37133 A1 | 8/1998 |
| WO | 9919900 | 4/1999 |
| WO | WO 99/16556 A1 | 4/1999 |
| WO | WO 99/16601 A1 | 4/1999 |
| WO | WO 99/17351 A1 | 4/1999 |
| WO | WO 99/61911 A2 | 12/1999 |
| WO | WO 00/10197 A1 | 2/2000 |
| WO | WO 00/10736 A1 | 3/2000 |
| WO | WO 00/29208 A1 | 5/2000 |
| WO | WO 00/69235 A1 | 11/2000 |
| WO | WO 00/72224 A1 | 11/2000 |
| WO | WO 01/54203 A2 | 7/2001 |
| WO | WO 01/56736 A2 | 8/2001 |
| WO | WO 01/82315 A1 | 11/2001 |
| WO | WO 01/87503 A1 | 11/2001 |
| WO | WO 02/04698 A2 | 1/2002 |
| WO | WO 02/05294 A1 | 1/2002 |
| WO | 02087749 | 11/2002 |
| WO | WO 02/098576 A1 | 12/2002 |
| WO | 03016961 | 2/2003 |
| WO | WO 03/018645 A1 | 3/2003 |
| WO | WO 03/032084 A2 | 4/2003 |
| WO | WO 03/035279 A1 | 5/2003 |
| WO | WO 03/038002 A1 | 5/2003 |
| WO | WO 03/051562 A1 | 6/2003 |
| WO | WO 03/106573 A1 | 12/2003 |
| WO | WO 02/05413 A1 | 1/2004 |
| WO | WO 2004/027787 A1 | 4/2004 |
| WO | WO 2004/050260 A3 | 6/2004 |
| WO | WO 2004/050350 A1 | 6/2004 |
| WO | WO 2004/062890 A2 | 7/2004 |
| WO | WO 2004/063295 A1 | 7/2004 |
| WO | WO 2004/068918 A3 | 8/2004 |
| WO | WO 2004/075211 A1 | 9/2004 |
| WO | WO 2004/078641 A1 | 9/2004 |
| WO | WO 2004/104153 A1 | 12/2004 |
| WO | WO 2004/105985 A1 | 12/2004 |
| WO | WO 2005/044451 A1 | 5/2005 |
| WO | WO 2004/030072 A1 | 1/2006 |
| WO | WO 2006/061557 A1 | 6/2006 |
| WO | 2006078825 | 7/2006 |
| WO | 2007053408 | 5/2007 |
| WO | 2007149883 | 12/2007 |

OTHER PUBLICATIONS

"Lithography—definition of Lithography in Encyclopedia"; Worldwide Web Reference Source; http://encyclopedia.laborlawtalk.com/Lithography; (Date Retrieved May 25, 2005).

"Materials, Silver Ink for Jet Printing"; NASA Tech Briefs; (Aug. 1989).

"Monolayer-Protected Clusters: Molecular Precursors to Metal Films"; Chemical Matters; vol. 13; pp. 87-95; (2001).

"Oligomeric Ketoester Precursors for Improved Polymide Planarization and Gapfiling"; IBM Technical Disclosure Bulletin; vol. 30; No. 1; pp. 343-346; (1987).

"Porosity-Grain Growth Relationships in the Sintering of Nanocrystalline Ceramics"; NanoStructured Materials; vol. 3; pp. 43-52; (1993).

(2005) "Definitions of Inkjet Printer on the Web:"; Worldwide Web Reference Source; http://www.google.com/search?hl+en&lr=&oi+defmore&q-defne:inkject+printer; (Date Retrieved; May 23, 2005).

(56) References Cited

OTHER PUBLICATIONS (2005) "How Printable Computes Will Work"; Worldwide Web Reference Source; http://computer.howstuffworks.com/printable-computer.htm/printable (Date Retrieved May 23, 2005).
(2005) "Screen Printing Technology, Principles of Screen-printing"; Worldwide Web Reference Source; http://www.spauk.co.ul/TechnicalPages/Screen%20TP.pdf; (Date Retrieved: May 3, 2006).
(2006)Photolithography: Definition and Much More From Answers.com; Worldwide Web Reference Source; http://www.answers.com/topic/photolithography; (Date Retrieved: May 25, 2005).
(Apr. 5, 2006); Photolithography Worldwide Web Reference Source; http://www.ece.gatech.edu/research/labs/vc/theory/photolitch.html; (Date Retrieved: May 25, 2005).
(Dec. 3, 2002); "Printing Drawings and Photographic Images"; Worldwide Web Reference Source; http://histclo.hispeed.com/photo/photo-print.html; (Date Retrieved; May 25, 2005).
B. Mayers et al.; "Large-Scale Synthesis of Monodisperse Nanorods of Se/Te Alloys Through a Homogeneous Nucleation and Solution Growth Process"; Advanced Materials; vol. 13, No. 18; (2001).
B. Wiley et al.; Polyol Synthesis of Silver nanostructures: Control of Product Morphology with Fe(II) or Fe(III) Species; Langmuir The ACS Journal of Surfaces and Colloids; vol. 21, No. 18; (2005).
B. Wiley et al.; "Polyol Synthesis of Uniform Silver Nanoparticles: Use of Chloride and Oxygen to Promote the Formation of Single-Crystal Truncated Cubes and Tetrahedrons"; Nano Letters; vol. 4, No. 9; pp. 1733-1739; (2004).
B. Wiley et al.; "Shape-Controlled Synthesis of Silver and Gold Nanostructures"; MRS Bulletin; vol. 30; (2005).
Blum, A.E. et al.; "Measurement of Clay Surface Areas by Polyvinylpyrrolidone (PVP) Sorption and its Use for Quantifying Illite and Smectite Abundance"; Clays and Clay Minerals; vol. 52; No. 5; pp. 589-602; (2004).
C. Chen et al.; "New Development of Nonlinear Optical Crystals for the Ultraviolet Region with Molecular Engineering Approach"; Journal of Applied Physics; vol. 77; No. 6; (1995).
Carotenuto, G. et al.; "A Qualitative Model for the Growth Mechanism of Silver Clusters in Polymer Solution"; The European Physical Journal B; vol. 24; pp. 437-441; (2001).
Darhuber et al.; "Physical Mechanism Governing Pattern Fidelity in Microscale Offset Printing"; Journal of Applied Physics; vol. 90; No. 7; pp. 3602-3609; (2001).
F. Bonet et al.; "Synthesis of Monodisperse Au, Pt, Pd, Ru and Ir Nanoparticles in Ethylene Glycol"; NanoStructured Materials; vol. 11; No. 8; pp. 1277-1284; (1999).
Fievet, F., et al.; "Preparing Monodisperse Metal Powders I Micrometer and Submicrometer Sizes by the Polyol Process"; MRS Bulletin; (Dec. 1989).
Fuller et al.; "Ink-Jet Printed Nanoparticle Microelectromechanical Systems"; Journal of Microelectromechanical Systems; vol. 11; No. 1; (2002).
Furusawa et al.; "late-News paper: Inkjet-Printed Bus and Address Electrodes for Plasma Display"; SID 02 Digest; pp. 753-755; (May 2002).
G. Carotenuto et al.; "Preparation and Characterization of Nano-Sized Ag/PVP Composites for Optical Applications"; The European Physical Journal B; vol. 16; pp. 11-17; (2000).
Goodman, N.B.; "Custom Color Liquid Ink Development (LID) Process"; Xerox Disclosure Journal, vol. 21; No. 2; pp. 157; (1996).
Harness et al.; "Site Selective Copper and Silver Electroless Metalization Facilitated by Photolithographically Patterned Hydrogen Silsequioxane Mediated Seed Layer"; American Chemical Society (2002).
J. Chen et al.; "Polyol Synthesis of Platinum Nanostructures: Control of Morphology Through the Manipulation of Reduction Kinetics"; Angewandte Chemical International Edition; vol. 44; pp. 2589-2592; (2005).
K. Dreyfack; "ITT Cuts Costs of PC Board Manufacturing"; Electronics; vol. 52; No. 17; (1979).

K. F. Teng et al.; "Liquid Ink Jet Printing with MOD inks for Hybrid Microcircuits"; IEEE Transaction on Components, Hybrids and Manufacturing Technology; vol. CHMT-12; No. 4; pp. 545-549; (1987).
Kawase, T. et al.; "All-Polymer Thin Film Transistors Fabricated by High-Resolution Ink-Jet Printing"; IEEE International Election Devices Meeting; pp. 25.5.1-25.5.4; (2000).
Lee, H.K. et al.; "One-step Preparation of Ultrafine Poly(acrylonitrile) Fibers Containing Silver Nanoparticles"; Materials Letters; vol. 59; pp. 2977-2980; (2005).
Lee, H-H et al.; "Inkjet Printing of Nanosized Silver Colloids"; Nanotechnology; vol. 16; pp. 2436-2441; (2005).
P. Y. Silvert et al.; "Synthesis of Monodisperse Submicronic Gold Particles by the Polyol Process"; Solid State Ionics; vol. 82; pp. 53-60; (1995).
P.Y. Silvert et al.; "Preparation of Colloidal Silver Dispersions by the Polyol Process part 1—synthesis and Characterization"; Journal of Material Chemistry; vol. 6; No. 4; pp. 573-577; (1996).
P.Y. Silvert et al.; "Preparation of Colloidal silver Dispersions by the Polyol Process Part 2—Mechanism of Particle Formation" Journal of Materials Chemistry; vol. 7; No. 2; pp. 293-299; (1997).
Pearson, R.C. et al.; "Ink Jet Color Copier and Universal Printer"; IBM Technical Disclosure Bulletin; vol. 16, No. 1; pp. 144-145; (1973).
R. He et al.; "Preparation of Polychrome Silver Nanoparticles in Different Solvents"; Journal of Materials Chemistry; vol. 12; pp. 3783-3786; (2002).
R.W. Vest et al.; "Ink Jet Printing of Hybrid Circuits"; Hybrid Microelectronics; vol. 6; pp. 261 and 267; (1983).
S. H. Im et al.; "Large-Scale synthesis of Silver Nanocubes: The Role of HICI in Promoting cube Perfection and Monodispersity"; Angewandte Chemical International Edition; vol. 44; pp. 2154-2157; (2005).
S. Komarneni et al.; Microwave-polyol Process for Metal Nanophases; Journal of Physics, Condensed Matter; vol. 16, pp. S1305-S1312; (2004).
Shah et al.; "Ink-Jet Printing Catalyst Patterns for Electroless Metal Deposition"; American Chemical Society; vol. 15; pp. 1584-1587; (1999).
Shimoda, T. et al.; "All-Polymer Thin Film Transistor Fabricated by High-Resolution Ink-Jet Printing"; IEEE International Solid State Circuits Conference; Session 16; (2004).
Spencer, O.S.; "Smoothing of Irregular $SiO_2$ Surface"; IBM Technical Disclosure Bulletin; vol. 20; No. 11B; pp. 4842-4843; (1978).
Szczech et al.; "Fine Line Conductor Manufacturing Using Drop-On-Demand PZT Printing Technology"; IEEE Transactions on Electronics Packaging Manufacturing; vol. 25; No. 1; (2002).
T. Herricks et al.; "Polyol Synthesis of Platinum Nanoparticles: Control of Morphology with Sodium Nitrate"; Nano Letters; vol. 4; No. 12; pp. 2367-2371; (2004).
Tay et al.; "Dispersion and Stability of Silver Inks"; Journal of Material Science; vol. 37; pp. 4653-4661; (2002).
Vanheusden et al.; "Advanced Materials Systems for Ultra-Low Temperature, Digital, Direct Write Technologies, Digital Direct Write Technologies"; Direct-Write Technologies for Rapid Prototyping applications; pp. 123-173; (2001).
Wiley, B. et al.; "Shape-Controlled Synthesis of Metal Nanostructures: The Case of Silver"; Chemistry, a European Journal; vol. 11; pp. 454-463; (2005).
X. Jiang et al.; "Ethylene Glycol-Mediated Synthesis of Metal Oxide Nanowires"; Journal of Materials Chemistry; vol. 14; pp. 695-703; (2004).
Y. Sun et al.; "Gold and silver Nanoparticles: A Class of Chromophores with Colors Tunable in the Range from 400 to 750 nm"; The Analyst, The Royal Society of Chemistry; vol. 128; pp. 686-691; (2003).
Y. Sun et al.; "Polyol Synthesis of Uniform Silver Nanowires: A Plausible Growth Mechanism and the Supporting Evidence"; Nano Letters; vol. 3, No. 7; pp. 955-960; (2003).
Y. Sun et al.; "Shape-Controlled Synthesis of Gold and Silver Nanoparticles"; Science Magazine; vol. 298; pp. 2176-2179; (2002).

(56) References Cited

OTHER PUBLICATIONS

Y. Sun et al.; "Transformation of Silver Nanospheres into Nanobelts and Triangular Nanoplates Through a Thermal Process"; Nano Letters; vol. 3; No. 5; pp. 675-679; (2003).

Y. Sun et al.; "Triangular Nanoplates of Silver: Synthesis, Characterization, and Use of Sacrificial Templates for Generating Triangular Nanorings of Gold"; Advanced Materials; vol. 15, No. 9; (2003).

Y. Sun et al.; "Uniform Silver Nanowires Synthesis by Reducing AgNO3 with Ethylene Glycol in the Presence of Seeds and Poly(Vinyl Pyrrolidone)"; Chemical Materials; vol. 14; pp. 4736-4745; (2005).

Y. Tan et al.; "Preparation of Gold, Platinum, Palladium and silver Nanoparticles by the Reduction of their Salts with a Weak Reduction-Potassium Bitartrate"; Journal of Material Chemistry; vol. 13; pp. 1069-1075; (2003).

Y. Xia et al.; "New Nonlinear Optical Crystals for UV and VUV Harmonic Generation"; Advanced Materials; vol. 7; No. 1; (1995).

Y. Yin et al.; "Silver Nanowires Can Be Directly Coated with Amorphous Silica to Generate Well-Controlled Coaxial Nanocables fo Silver/Silica"; Nano Letters; vol. 2; No. 4; pp. 427-430; (2002).

Z. Zhang et al.; "PVP Protection Mechanism of Ultrafine Silver Powder Synthesized by Chemical Reduction Processes"; Journal of Solid State Chemistry; vol. 121; No. 0015; pp. 105-110; (1996).

Metal Nanoparticle Compositions, Vanheusden, et al., U.S. Appl. No. 11/331,211 (Jan. 13, 2006).

Separation of Metal Nanoparticles, Vanheusden, et al., U.S. Appl. No. 11/331,238 (Jan. 13, 2006).

Production of Metal Nanoparticles, Vanheusden, et al., U.S. Appl. No. 11/331,230 (Jan. 13, 2006).

Printable Electronic Conductors, Vanheusden, et al., U.S. Appl. No. 11/231,231 (Jan. 13, 2006).

Replacement of Passive Electrical Components, Howarth, et al., U.S. Appl. No. 11/331,186 (Jan. 13, 2006).

Circuit Modeling and Selective Deposition, Howarth, et al., U.S. Appl. No. 11/331,188 (Jan. 13, 2006).

Ink-Jet Printing of Compositionally Non-Uniform Features, Vanheusden, et al., U.S. Appl. No. 11/331,237 (Jan. 13, 2006).

Printable Electronic Features on Non-Uniform Substrate and Processes for Making Same, Vanheusden, et al., U.S. Appl. No. 11/331,190 (Jan. 13, 2006).

Controlling Ink Migration During the Formation of Printable Electronic Features, Kowalski, et al., U.S. Appl. No. 11/331,185 (Jan. 13, 2006).

Processes for Planarizing Substrates and Encapsulating Printable Electronic Features, Mark Kowalski, U.S. Appl. No. 11/331,239 (Jan. 13, 2006).

Optimized Multi-Layer Printing of Electronics and Displays, Edwards, et al., U.S. Appl. No. 11/331,187 (Jan. 13, 2006).

A System and Process for Manufacturing Application Specific Printable Circuits (ASPC's) and Other Custom Electronic Devices, Chuck Edwards, U.S. Appl. No. 11/331,187 (Jan. 13, 2006).

A System and Process for Manufacturing Custom Electronics by Combining Traditional Electronics with Printable Electronics, Chuck Edwards, U.S. Appl. No. 11/331,191 (Jan. 13, 2006).

Security Features, Their Use, and Processes for Making Them, Hampden-Smith et al., U.S. Appl. No. 11/331,233 (Jan. 13, 2006).

Tape Compositions for the Deposition of Electronic Features, T. Kodas, U.S. Appl. No. 10/274,495 (Oct. 18, 2002).

Notification of Transmittal of the International Search Report and the Written Opinion of the International Searching Authority for International Application PCT/US2008/065398 mailed Oct. 14, 2008; International Search Report; Written Opinion.

Palchik et al., Preparation and Characterization of Ni/NiO Composite Using Mircrowave Irradiation and Sonication, NanoStructured Materials., (1999), vol. 11, No. 3, pp. 415-420.

Kwon, et al, Viscosity of Magnetic Particle Suspension, Journal of Molecular Liquids 75 (1998), pp. 115-126.

\* cited by examiner

PRODUCTION OF METAL NANOPARTICLES

CROSS-REFERENCE TO RELATED APPLICATIONS

This application is a continuation of U.S. patent application Ser. No. 11/755,720, filed May 30, 2007, now U.S. Pat. No. 7,824,466, which is a continuation-in-part of U.S. patent application Ser. No. 11/331,230, filed Jan. 13, 2006, now U.S. pat. No. 7,749,299, which claims the benefit of U.S. Provisional Patent Applications Ser. Nos. 60/643,577, 60/643,629 and 60/643,578, all filed on Jan. 14, 2005. The entireties of each of the above-referenced patent applications are incorporated herein by reference.

STATEMENT REGARDING FEDERALLY SPONSORED RESEARCH

This invention was made with Government support under Agreement No. MDS972-93-2-0014 or DAAD1919-02-3-0001 awarded by the Army Research Laboratory ("ARL"). The Government has certain rights in the invention.

BACKGROUND OF THE INVENTION

1. Field of the Invention

The present invention relates to processes for producing metal nanoparticles. In particular, the invention relates to processes for forming metal nanoparticles, which processes afford excellent control of the size, size distribution and/or shape of the metal nanoparticles.

2. Discussion of Background Information

The production of metal particles by the so-called polyol process is known from, e.g., U.S. Pat. No. 4,539,041 to Figlarz et al., the entire disclosure of which is expressly incorporated by reference herein. In the polyol process, a metal precursor is reduced preferably at an elevated temperature by a polyol to afford the corresponding metal in the form of particles (usually in the micron and nanometer size range). A number of metal precursors and in particular, a number of transition metal precursors can be converted to metal particles by this process. In a typical procedure, a metal precursor is dissolved in a polyol and the suspension is heated until the reduction of the metal precursor is substantially complete. Thereafter, the formed particles are isolated by separating them from the liquid phase, e.g., by centrifugation.

A modification of this method is described in, e.g., P.-Y. Silvert et al., "Preparation of colloidal silver dispersions by the polyol process" Part 1—Synthesis and characterization, *J. Mater. Chem.*, 1996, 6(4), 573-577; and Part 2—Mechanism of particle formation, *J. Mater. Chem.*, 1997, 7(2), 293-299, the entire disclosures of which are expressly incorporated by reference herein. According to Silvert et al., the polyol process is carried out in the presence of a polymer, i.e., polyvinylpyrrolidone (PVP). In particular, the PVP is dissolved in the polyol and helps to control the size and the dispersibility of the metal particles.

It has now been discovered, however, that the size and shape of the particles formed in the modified polyol process are not uniform. Further, it has been discovered that large "chunks" and needle-like particles may undesirably be formed in the modified polyol process, in addition to the formation of sphere-like particles. Accordingly, the need exists for processes of the type described by Silvert et al., which afford satisfactory results in terms of particle size, shape and/or size distribution.

Another problem associated with the modified polyol process is that, from batch to batch, the process may yield metal nanoparticles having inconsistent properties such as particle size, shape and particle size distribution, depending on the specific composition and quality of the commercial polymer (e.g., PVP) employed. For example, water and/or other contaminants may be present in the polymer in amounts sufficient to undesirably modify the properties of the metal nanoparticles formed. Accordingly, the need exists for processes that consistently afford satisfactory results in terms of particle size, shape and/or size distribution of metal particles, formed in a polyol process, particularly on scale-up of the process, in which large quantities of raw materials typically provide more contaminants.

SUMMARY OF THE INVENTION

The present invention provides a process for the production of metal particles, particularly metal nanoparticles. In one aspect, the invention is directed to a process for the production of metal nanoparticles, wherein the process comprises mixing (a) a heated first solution comprising a polyol, a reducing agent and a polymer of vinyl pyrrolidone; with (b) a second solution comprising a metal precursor that is capable of being reduced to a metal. The reducing agent preferably comprises a non-polyol reducing agent, e.g., ammonium formate or formic acid. Optionally, the process further comprises the steps of heating a powder of the polymer of vinylpyrrolidone to a temperature from about 70° C. to about 120° C.; and forming the first solution from the powder, the non-polyol reducing agent, and the polyol. Optionally, the process further comprises at least one of purging or sparging the resulting mixture, e.g., with an inert gas, oxygen or air.

In another embodiment, the invention is directed to a process for the production of metal nanoparticles, wherein the process comprises mixing (a) a heated first solution comprising a polyol, a base and a polymer of vinyl pyrrolidone; with (b) a second solution comprising a metal precursor that is capable of being reduced to a metal. Optionally, the base comprises sodium hydroxide or tetramethylammonium hydroxide. The base may be present in the first solution in an amount from about 0.1 mol per mol of metal to about 0.5 mol per mol of metal. Optionally, the first solution further comprises a non-polyol reducing agent.

In another embodiment, the invention is directed to a process for the production of metal nanoparticles, wherein the process comprises: (a) heating a powder of a polymer of vinylpyrrolidone to a temperature from about 70° C. to about 120° C.; (b) forming a heated first solution comprising the powder and a polyol; and (c) mixing the heated first solution with a second solution comprising a metal precursor that is capable of being reduced to a metal. For example, the powder optionally is sustained at the temperature for from about 12 hours to about 150 hours.

BRIEF DESCRIPTION OF THE DRAWINGS

The present invention will be better understood in view of the following non-limiting figures, wherein.

DETAILED DESCRIPTION OF THE PRESENT INVENTION

Overview

Figure 1:
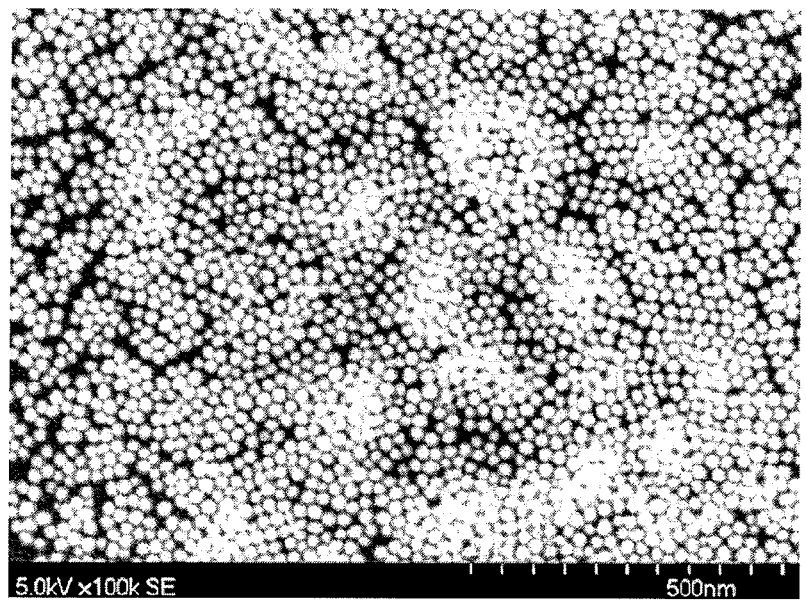
FIG. 1 presents a scanning electron micrograph (SEM) of the nanoparticles formed according to Sample G of Example 2.

According to one embodiment of the present invention, a heated first solution comprising a reducing agent (e.g., a non-polyol reducing agent) and/or a base, a polyol and a polymer of vinyl pyrrolidone is mixed with a second solution comprising a metal precursor that is capable of being reduced to a metal by the polyol, thereby producing metal nanoparticles. Preferably, the second solution further comprises a polyol, which may be the same polyol or a different polyol than contained in the first solution. It has now been discovered that the size and/or the size distribution and/or the shape of the nanoparticles formed from the metal precursor desirably may be influenced by the presence of a reducing agent, e.g., a non-polyol reducing agent, and/or a base in the first solution. Further, it has been found that the reaction that produces the metal nanoparticles proceeds faster when a reducing agent, e.g., a non-polyol reducing agent, and/or a base is/are present in the first solution.

Without being bound by theory, it is believed that the presence of a reducing agent (e.g., a non-polyol reducing agent) in the first solution aids in reducing the metal precursor in a nucleation event to form metal nuclei. After the nucleation event, additional metal precursor is reduced by an alcohol (preferably a polyol) in a growth step or phase. In the growth step, additional metal is deposited on the metal nuclei to form metal nanoparticles having the desired physical characteristics, e.g., particle size, particle size distribution, morphology, etc. In addition, it is possible that alcohol groups terminating the polymer of vinyl pyrrolidone may also be responsible, possibly in part, for reducing the metal precursor to the metal in the growth step. Ultimately, the polymer of vinyl pyrrolidone present in the reaction mixture ceases the growth phase of the reaction process by capping the metal nanoparticles to form metal nanoparticles that are coated or "capped" with the polymer of vinylpyrrolidone.

In another aspect, a base is included in the first solution. For reasons that are not entirely clear, as described below, the presence of base in the reaction mixture surprisingly and unexpectedly has been shown to significantly increase the rate of formation of the metal nanoparticles in some aspects of the present invention.

In another aspect of the invention, which optionally may be combined with the above-described embodiments in which a reducing agent (e.g., a non-polyol reducing agent) and/or a base is included in the first solution, the polymer of vinylpyrrolidone is heated, preferably as a powder, prior to the formation of the first solution. Specifically, in this embodiment, the process includes the steps of: (a) heating a powder of a polymer of vinylpyrrolidone to a temperature from about 70° C. to about 120° C.; (b) forming a heated first solution comprising the powder and a polyol; and (c) mixing the heated first solution with a second solution comprising a metal precursor that is capable of being reduced to a metal by the polyol. Without being bound by any particular theory, the heating of the polymer is believed to liberate water and alter the polymer capping characteristics in a way that leads to improved association of polymer with the metal particle and therefore substantially reduce agglomeration and/or excessive growth. This, in turn, leads to better control of particle size, shape and particle size distribution.

Metal Precursor

The metal precursors that may be used in the processes of the present invention include all metal precursors that a polyol can reduce to the corresponding metal (oxidation state=0), in particular in the growth phase of the reaction process. In those embodiments of the present invention that employ a non-polyol reducing agent in addition to a polyol reducing agent, the metal precursor also should be able to be reduced by the non-polyol reducing agent, preferably more readily than by the polyol employed. Non-limiting examples of such metals include main group metals such as, e.g., lead, tin, antimony and indium, and transition metals, e.g., a transition metal selected from the group consisting of gold, silver, copper, nickel, cobalt, palladium, platinum, iridium, osmium, rhodium, ruthenium, rhenium, vanadium, chromium, manganese, niobium, molybdenum, tungsten, tantalum, iron and cadmium. Examples of preferred metals include gold, silver, copper and nickel, in particular, silver, copper and nickel. Silver is a particularly preferred metal for the purposes of the present invention.

The metal precursor preferably is dissolved, at least to some extent, in the second solution. Thus, the metal precursor should be soluble to at least some extent in at least one solvent in the second solution. Preferably, the solvent comprises a polyol (e.g., the same or different polyol contained in the heated first solution) and/or a solvent that is substantially miscible with the heated first solution. Also, the metal precursor preferably will be soluble to at least some extent in the polyol(s) in the heated first solution so that there is no substantial precipitation or other separation of the metal precursor from the liquid phase when the solution of the metal precursor (the second solution) is contacted and mixed with the first heated first solution.

Non-limiting examples of suitable metal precursors include metal oxides, metal hydroxides (including hydrated oxides), metal salts of inorganic and organic acids such as, e.g., nitrates, nitrites, sulfates, halides (e.g., fluorides, chlorides, bromides and iodides), carbonates, phosphates, azides, borates (including fluoroborates, pyrazolylborates, etc.), sulfonates, carboxylates (such as, e.g., formates, acetates, propionates, oxalates and citrates), substituted carboxylates (including halogenocarboxylates such as, e.g., trifluoroacetates, hydroxycarboxylates, aminocarboxylates, etc.) and salts and acids wherein the metal is part of an anion (such as, e.g., hexachloroplatinates, tetrachloroaurate, tungstates and the corresponding acids).

Further non-limiting examples of suitable metal precursors for the processes of the present invention include alkoxides, complex compounds (e.g., complex salts) of metals such as, e.g., beta-diketonates (e.g., acetylacetonates), complexes with amines, N-heterocyclic compounds (e.g., pyrrole, aziridine, indole, piperidine, morpholine, pyridine, imidazole, piperazine, triazoles, and substituted derivatives thereof), aminoalcohols (e.g., ethanolamine, etc.), amino acids (e.g., glycine, etc.), amides (e.g., formamides, acetamides, etc.), and nitriles (e.g., acetonitrile, etc.). Non-limiting examples of preferred metal precursors include nitrates, formates, acetates, trifluoroacetates, propionates, oxalates and citrates, particularly nitrates and acetates.

Non-limiting examples of specific metal precursors for use in the processes of the present invention include silver nitrate, silver nitrite, silver oxide, silver fluoride, silver hydrogen fluoride, silver carbonate, silver oxalate, silver azide, silver tetrafluoroborate, silver acetate, silver propionate, silver butanoate, silver ethylbutanoate, silver pivalate, silver cyclohexanebutanoate, silver ethylhexanoate, silver neodecanoate, silver decanoate, silver trifluoroacetate, silver pentafluoropropionate, silver heptafluorobutyrate, silver trichloroacetate, silver 6,6,7,7,8,8,8-heptafluoro-2,2-dimethyl-3,5-octanedionate, silver lactate, silver citrate, silver glycolate, silver glyconate, silver benzoate, silver salicylate, silver phenylacetate, silver nitrophenylacetate, silver dinitrophenylacetate, silver difluorophenylacetate, silver 2-fluoro-5-nitrobenzoate, silver acetylacetonate, silver hexafluoroacetylacetonate, silver trifluoroacetylacetonate, silver tosylate, silver triflate, silver trispyrazolylborate, silver tris(dimethylpyrazolyl)borate, silver ammine complexes, trialkylphosphine and triarylphosphine derivatives of silver carboxylates, silver beta-diketonates, silver beta-diketonate olefin complexes and silver cyclopentadienides; nickel oxide, nickel hydroxide, nickel chloride, nickel nitrate, nickel sulfate, nickel ammine complexes, nickel tetrafluoroborate, nickel oxalate, nickel isopropoxide, nickel methoxyethoxide, nickel acetylacetonate, nickel formate, nickel acetate, nickel octanoate, nickel ethylhexanoate, and nickel trifluoroacetate; platinum formate, platinum acetate, platinum propionate, platinum carbonate, platinum nitrate, platinum perchlorate, platinum benzoate, platinum neodecanoate, platinum oxalate, ammonium hexafluoroplatinate, ammonium tetrachloroplatinate, sodium hexafluoroplatinate, potassium hexafluoroplatinate, sodium tetrachloroplatinate, potassium hexabromoplatinate, hexachloroplatinic acid, hexabromoplatinic acid, dihydrogen hexahydroxoplatinate, diammine platinum chloride, tetraammine platinum chloride, tetraammine platinum hydroxide, tetraammine platinum tetrachloroplatinate, platinum(II) 2,4-pentanedionate, diplatinum trisdibenzylideneacetonate, platinum sulfate and platinum divinyltetramethyldisiloxane; gold(III) acetate, gold(III) chloride, tetrachloroauric acid, gold azide, gold isocyanide, gold acetoacetate, imidazole gold ethylhexanoate and gold hydroxide acetate isobutyrate; palladium acetate, palladium propionate, palladium ethylhexanoate, palladium neodecanoate, palladium trifluoracetate, palladium oxalate, palladium nitrate, palladium chloride, tetraammine palladium hydroxide, tetraammine palladium nitrate and tetraammine palladium tetrachloropalladate; copper oxide, copper hydroxide, copper nitrate, copper sulfate, copper chloride, copper formate, copper acetate, copper neodecanoate, copper ethylhexanoate, copper methacrylate, copper trifluoroacetate, copper acetoacetate and copper hexafluoroacetylacetonate; cobalt oxide, cobalt hydroxide, cobalt chloride and cobalt sulfate; ruthenium(III) chloride, ruthenium(III) acetylacetonate, ruthenium(III) acetate, ruthenium carbonyl complexes, ruthenium perchlorate, and ruthenium amine complexes; rhodium(III) chloride, rhenium(II) chloride, tin(II) oxide, iron(II) acetate, sodium tungstate and tungstic acid. The above compounds may be employed as such or optionally in the form of solvates and the like such as, e.g., as hydrates.

Examples of preferred metal precursors for use, alone or in combination, in the processes of the present invention include silver nitrate, silver acetate, silver trifluoroacetate, silver oxide, copper oxide, copper hydroxide, copper sulfate, nickel oxide, nickel hydroxide, nickel chloride, nickel sulfate, nickel acetate, cobalt oxide, cobalt hydroxide, cobalt chloride and cobalt sulfate.

The use of mixtures of different compounds, e.g., different salts, of the same metal and/or the use of mixtures of compounds of different metals and/or of mixed metal compounds (e.g., mixed salts and/or mixed oxides) are also contemplated by the present invention. Accordingly, the term "metal precursor" as used herein includes both a single metal precursor and any mixture of two or more metal precursors. Depending, inter alia, on the metal precursors and reaction conditions employed, the use of more than one metal in the processes of the present invention will result in a mixture of nanoparticles of different metals and/or in nanoparticles which comprise different metals in the same nanoparticle, for example, in the form of an alloy or a mixture of these metals. Non-limiting examples of alloys include Ag/Ni, Ag/Cu, Pt/Cu, Ru/Pt, Ir/Pt and Ag/Co. Alternatively, or in addition to an alloy or mixture, metal nanoparticles having a core made up of one metal and a shell comprising a second metal are contemplated by the present invention. Such metal nanoparticles can have a core comprising one metal and a shell comprising a second metal formed thereon. In this scenario, a metal nucleus comprising one metal is produced initially. A different metal subsequently deposits on the metal nucleus, e.g., in the growth phase, thereby forming a metal nanoparticle having a core comprising one metal and a shell comprising a different metal.

Polyol

As indicated above, in the processes of the present invention, the first solution comprises an alcohol, preferably a polyol. Additionally, the second solution preferably comprises a polyol. The polyol for use in the processes of the present invention may be a single polyol or a mixture of two or more polyols (e.g., three, four or five polyols). In the following description, whenever the term "polyol" is used, this term is meant to include both a single polyol and a mixture of two or more polyols. In one aspect, the first solution comprises a first polyol and the second solution comprises a second polyol, different from the first polyol. In another aspect, the first solution comprises the same polyol that is contained in the second solution.

The polyol used, whether in the first solution and/or in the second solution, may have any number of hydroxyl groups (but at least two) and carbon atoms. Also, the polyol may comprise heteroatoms (such as, e.g., O and N), not only in the form of hydroxyl groups, but also in the form of, e.g., ether, ester, amine and amide groups and the like (for example, it may be a polyester polyol, a polyether polyol, etc.). Preferably, the polyol comprises from about 2 to about 6 hydroxy groups (e.g., 2, 3 or 4 hydroxy groups). Also, the preferred polyol comprises from 2 to about 12 carbon atoms, e.g., up to about 3, 4, 5 or 6 carbon atoms. A particularly preferred group of polyols for use in the present invention are the (alkylene) glycols, i.e., compounds which comprise two hydroxyl groups separated by an aliphatic or cycloaliphatic carbon chain. Usually these glycols will comprise up to about 6 carbon atoms, e.g., 2, 3 or 4 carbon atoms. Ethylene glycol, propylene glycol and the butylene glycols are non-limiting examples of preferred glycols for use in the present invention. The polyglycols constitute another group of preferred polyols for use in the present invention. Specific and preferred examples thereof are compounds which comprise up to about 6 alkylene glycol units, e.g., up to 4 alkylene glycol units, such as, e.g., diethylene glycol, triethylene glycol, tetraethylene glycol, dipropylene glycol and tripropylene glycol. In another aspect, the first solution and/or the second solution comprises one or more monoalcohols, such as, for example, one or more of methanol, ethanol, a propanol, a butanol, a pentanol, or other monoalcohols.

Non-limiting examples of other specific compounds which may advantageously be used as the or a polyol in the process of the present invention include 1,3-propanediol, 1,2-butanediol, 2,3-butanediol, 1,3-butanediol, 1,4-butanediol, glycerol, trimethylolpropane, pentaerythritol, triethanolamine and trihydroxymethylaminomethane.

Of course, it also is possible to use other polyols than those mentioned above, either alone or in combination. For example, sugars and sugar alcohols can form at least a part of the polyol reactant of the process of the present invention. While polyols that are solid or semi-solid at room temperature may be employed, it is preferred that the employed polyol or at least the employed mixture of polyols is liquid at room temperature, although this is not required.

Non-Polyol Reducing Agents

The polyols mentioned above can serve as a reducing agent for the purposes of the present invention, particularly in the nanoparticle growth phase, described above. In some embodiments of the present invention, however, a non-polyol reducing agent is used as an additional reducing agent. The non-polyol reducing agent can help reduce the required time and/or the temperature at which the reduction reaction occurs (for example by initiating a nucleation event) relative to a situation where a polyol is used as the sole reducing agent. In the following description, whenever the term "non-polyol reducing agent" is used, this term is meant to include both a single non-polyol reducing agent and a mixture of two or more non-polyol reducing agents.

Preferably, the non-polyol reducing agent has a standard reduction potential less than, preferably substantially less than, that of the polyol employed, such that the non-polyol reducing agent preferentially reduces the metal precursor to its metal immediately upon mixing of the first and second solutions. The reduction of the metal precursor by the non-polyol reducing agent preferably initiates a nucleation event in which metal nuclei are formed, as discussed above. The metal nuclei act as seeds for the formation of additional metal thereon in the growth phase. The additional metal formed on the nuclei may be formed primarily from the reduction of the metal precursor by the polyol that is employed.

Non-limiting examples of non-polyol reducing agents which may be employed in accordance with the present invention include hydrazine and derivatives thereof; hydroxylamine and derivatives thereof; monohydric alcohols such as, e.g, methanol and ethanol, aldehydes such as, e.g., formaldehyde, ammonium formate, formic acid, acetaldehyde, and propionaldehyde, or salts thereof (e.g., ammonium formate); hypophosphites; sulfites; tetrahydroborates (such as, e.g., the tetrahydroborates of Li, Na, K); lithium aluminum hydride ($LiAlH_4$); sodium borohydride ($NaBH_4$); polyhydroxybenzenes such as, e.g., hydroquinone, alkyl-substituted hydroquinones, catechols and pyrogallol; phenylenediamines and derivatives thereof; aminophenols and derivatives thereof; carboxylic acids and derivatives thereof such as, e.g., ascorbic acid, citric acid, and ascorbic acid ketals; 3-pyrazolidone and derivatives thereof; hydroxytetronic acid, hydroxytetronamide and derivatives thereof; bisnaphthols and derivatives thereof; sulfonamidophenols and derivatives thereof; and Li, Na and K. Preferred non-polyol reducing agents comprise ammonium formate, formic acid, formaldehyde, acetaldehyde, propionaldehyde, ascorbic acid, citric acid, sodium borohydride, lithium aluminum hydride, or lithium triethylborohydride. A particularly preferred non-polyol reducing agent comprises ammonium formate.

The foregoing, non-limiting list of non-polyol reducing agents is meant to be a non-exhaustive list of non-polyol reducing agents that can be used in various processes of the present invention. The skilled artisan will recognize, however, that there are myriad other non-polyol reducing agents that may be employed in these processes of the present invention, so long as they are able to reduce the metal precursor to a metal, preferably more readily than the polyol employed. The reduction potential of the non-polyol reducing agent differs from the reduction potential of the metal precursor by from about 0.2 V to about 3.0 V, e.g., from about 0.2 to about 2.0 V, from about 0.3 to about 1.5 V, or from about 0.4 to about 1 V. For example, the difference in reduction potentials ($\Delta V$) between the non-polyol reducing agent and the metal precursor is optionally greater than about 0.3V, greater than about 0.5 V, greater than about 1 V or greater than about 1.5V.

As indicated above, if employed, the non-polyol reducing agent preferably is present in an amount sufficient to initiate a nucleation event in which the metal precursor is reduced to form metal nuclei. The specific amount of non-polyol reducing agent employed may vary widely, depending, for example, on the reduction potentials of the metal precursor, the non-polyol reducing agent, and the polyol employed. In some embodiments, the amount of non-polyol reducing agent used is an amount sufficient to reduce at least about 0.01 wt. % of metal precursor, e.g., at least about 0.1 wt. %, at least about 0.5 wt. %, at least about 1.0 wt. %, at least about 2 wt. % or at least about 5 wt. % of metal precursor, based on the total amount of metal precursor in the reaction mixture at the beginning of the mixing. In some preferred embodiments, the non-polyol reducing agent is present in the first solution in an amount sufficient to reduce from about 1 to about 25 wt. % of the metal precursor, e.g., from about 2 wt. % to about 5 wt. % or from about 5 wt. % to about 20 wt. % of metal precursor, based on the total weight of the metal precursor in the reaction mixture at the beginning of the mixing. In terms of concentration, the non-polyol reducing agent optionally is present in the first solution in an amount greater than about 0.01 mol (based on the amount of metal cations in the second solution), e.g., greater than about 0.1 mol %, greater than about 1 mol % or greater than about 5 mol %.

The amount of non-polyol reducing agent employed may also depend on the amount of polymer of vinylpyrrolidone that is included in the first solution. For example, the amount of non-polyol reducing agent employed in the first solution optionally is from about 0.2 to about 10% by weight of polymer of vinylpyrrolidone, e.g., from about 0.2 to about 5% by weight, from about 0.2 to about 0.6% by weight, from about 1 to about 5% by weight or from about 4 to about 9% by weight of polymer of vinylpyrrolidone. In a preferred embodiment, the amount of non-polyol reducing agent used is from about 0.2 to about 0.6% by weight of polymer of vinylpyrrolidone. In another preferred embodiment, the amount of non-polyol reducing agent used is about 0.35% by weight of polymer of vinylpyrrolidone.

The amount of non-polyol reducing agent employed in the first solution also depends on the amount of metal precursor that is included in the second solution. For example, the amount of non-polyol reducing agent employed in the first solution optionally is from about 5 to about 60% by weight of metal precursor, e.g., from about 20 to about 50% by weight, from about 15 to about 30% by weight, from about 10 to about 20% by weight or from about 5 to about 20% by weight of metal precursor. In a preferred embodiment, the amount of non-polyol reducing agent used is from about 10 to about 20% by weight of metal precursor.

Bases

As discussed above, in some embodiments of the present invention, one or more bases are included in the heated first solution, optionally in combination with the reducing agent (e.g., non-polyol reducing agent). The presence of base in the first solution has been shown to facilitate the formation of metal from the metal precursor. In the following description, whenever the term "base" is used, this term is meant to include both a single base and a mixture of two or more bases.

The base that is optionally employed in the first solution in the processes of the present invention may comprise either an organic base or an inorganic base. In one embodiment, the base comprises both an organic base and an inorganic base. Organic bases include, for example, primary, secondary and tertiary alkyl amines, including substituted amines, cyclic amines, arylamines and the like. Specific examples of organic bases include, but are not limited to, phenylamine, N,N-diphenylamine, N,N'-dibenzylethylenediamine, diethylamine, 2-diethylaminoethanol, 2-dimethylaminoethanol, ethanolamine, ethylenediamine, morpholine, N-alkyl morpholines (e.g., N-methyl morpholine), N-alkyl piperidines (e.g., N-methylpiperidine), piperazine, N-alkyl piperazine (e.g., N-methylpiperazine), N,N-diallylpiperazine (e.g., 1,4 dimethylpiperazine), isopropylamine, triethylamine, trimethylamine, tripropylamine, tromethamine and the like. Organic bases also include aromatic nitrogen-containing bases (substituted and unsubstituted) such as pyrrole, pyridine, pyrimidine and the like. Organic bases also include primary, secondary and tertiary alkoxides, as well as aryl oxide bases and the like. Specific examples of alkoxide bases include methoxide, ethoxide, propoxide, butoxide, t-butoxide and the like. Specific examples of aryl oxide bases include phenoxide, tolyloxide and the like. The skilled artisan will recognize that alkoxide and aryloxide bases, for example, must contain a counterion. Exemplary counterions include sodium, potassium, calcium and the like. In another embodiment, the based comprises an organic hydroxide, a preferred organic hydroxide being tetraalkyl ammonium hydroxide.

Inorganic bases include, for example, carbonates, hydroxides and the like, although compounds that generate hydrogen gas upon deprotonation (e.g., $LiAlH_4$ and NaH and $NaBH_4$) are also contemplated. The skilled artisan will recognize that the carbonate and hydroxide bases must also contain a counterion. Exemplary counterions include, ammonium, sodium, potassium, calcium and the like. Particularly preferred bases include sodium hydroxide and tetramethylammonium hydroxide.

The amount of base employed in the reaction mixture may vary widely, depending, for example, on the reaction atmosphere employed. It may be advantageous to sparge the reaction mixture with air or nitrogen in which case a smaller amount of base is utilized. In some embodiments, the amount of base used in the processes of the present invention is from about 0.1 to about 0.8 moles of base per mole of metal precursor, e.g., from about 0.1 to about 0.5 moles of base per mole of metal precursor, from about 0.1 to about 0.3 moles of base per mole of metal precursor or from about 0.2 to about 0.3 moles of base per mole of metal precursor. In a preferred embodiment, the amount of base used is about 0.22 moles of base per mole of metal precursor. In the case of an organic base, such as tetramethyl ammonium hydroxide, the mole ratio of the base to the metal precursor optionally is at least about 0.1, for example, at least about 0.2, at least about 0.3, at least about 0.4, at least about 0.5, or at least about 0.6.

The skilled artisan will recognize that the bases that are used in the process of the present invention not only function as bases in the Brønsted-Lowry/Lewis base sense, but some bases described above can also function as reducing agents (e.g., a non-polyol reducing agents) by virtue of the fact that they are electron rich. For example, many of the amines described above are electron rich by virtue of the fact that they comprise free electron pairs on the nitrogen that can be removed in a redox reaction with the metal ion of the metal precursor.

Polymer of Vinylpyrrolidone

One of the functions of the polymer of vinylpyrrolidone will usually and preferably be to help prevent a substantial agglomeration of the metal nanoparticles produced by the processes of the present invention. Due to their small size and the high surface energy associated therewith, the metal nanoparticles exhibit a strong tendency to agglomerate and form larger secondary particles (for example, soft agglomerates). The polymer of vinylpyrrolidone will shield (e.g., sterically and/or through charge effects) the nanoparticles from each other to at least some extent by, e.g., adsorbing onto the nanoparticles, thereby substantially reducing or preventing a direct contact between the metal core of individual nanoparticles.

The term "adsorbed" as used herein includes any kind of interaction between the polymer of vinylpyrrolidone and a nanoparticle surface (e.g., the metal atoms on the surface of a nanoparticle) that manifests itself in an at least weak bond between the polymer of vinylpyrrolidone and the surface of a nanoparticle. Preferably, the bond is strong enough for the nanoparticle-polymer of vinylpyrrolidone combination to withstand a washing operation with a solvent for the polymer of vinylpyrrolidone. In other words, merely washing the nanoparticles with the solvent at room temperature will preferably not remove more than minor amounts (e.g., less than about 10%, less than about 5%, or less than about 1%) of that part of the polymer of vinylpyrrolidone that is in direct contact with (and (weakly) bonded to) the nanoparticle surface. Of course, polymer of vinylpyrrolidone that is not in direct contact with a nanoparticle surface and is merely associated with the bulk of the nanoparticles as a contaminant, i.e., without any significant interaction with the nanoparticles, is preferably removable from the nanoparticles by washing the latter with a solvent.

While the polymer of vinylpyrrolidone will usually be a single substance or at least comprise substances of the same type, the present invention also contemplates the use of two or more different types of polymers of vinylpyrrolidone. For example, a mixture of two or more different low molecular weight compounds or a mixture of two or more different polymers may be used, as well as a mixture of one or more low molecular weight compounds and one or more polymers.

The polymer of vinylpyrrolidone should preferably be compatible with the polyol in the heated first solution, i.e., it preferably does not react with the polyol to any significant extent, even at the elevated temperatures that will often be employed in the process of the present invention. If the heated first solution does not comprise any other solvent for the polymer of vinylpyrrolidone, the polymer should also dissolve in the polyol comprised in the second solution to at least some extent. The polymer of vinylpyrrolidone will usually have a solubility at room temperature of at least about 1 g per liter of solvent (including solvent mixtures), e.g., at least about 5 g, at least about 10 g, or at least about 20 g per liter of solvent. Preferably, the polymer of vinylpyrrolidone has a solubility of at least about 100 g, e.g., at least about 200 g, or at least about 300 g per liter of solvent.

In one aspect of the process of the present invention, the polymer of vinylpyrrolidone is also capable of reducing the metal precursor, i.e., in addition to the reduction by the polyol used and the optional reducing agent (e.g., a non-polyol reducing agent). While not bound by theory, it is believed that functional terminal groups on the polymer of vinylpyrrolidone (e.g., alcohols and aldehydes), are responsible for the reducing capabilities of polymers of vinylpyrrolidone. A specific, non-limiting example of a polymer of vinylpyrrolidone is polyvinylpyrrolidone (PVP).

The polymer of vinylpyrrolidone may comprise polymers of vinylpyrrolidone, e.g., having a (weight average) molecular weight (in Daltons) of up to about 100,000. In some embodiments, the molecular weight of the polymer of vinylpyrrolidone is at least about 1,000, for example, at least about 3,000, at least about 5,000, or at least about 8,000, but preferably not higher than about 500,000, e.g., not higher than about 200,000, or not higher than about 100,000. In some embodiments, the polymers of vinylpyrrolidone have a weight average molecular weight of not less than about 5,000, e.g., a weight average molecular weight of about 10,000. Some preferred ranges of weight average molecular weights for the polymer of vinylpyrrolidone include from about 5,000 to about 100,000, e.g., from about 5,000 to about 60,000, from about 5,000 to about 25,000, or from about 5,000 to about 15,000. If the molecular weight of the polymer of vinylpyrrolidone is too high (e.g., $1\times10^6$) that may give rise to an undesirably high viscosity of the solution at a desirable concentration of the polymer of vinylpyrrolidone and/or cause flocculation. If the molecular weight is too low (e.g., less than 5,000) this gives rise to excessive agglomeration of metal nanoparticles. While not bound by theory, it is believed that polymer of vinylpyrrolidone with a molecular weight of less than, e.g., 5,000 does not provide sufficient steric bulk to minimize agglomeration of metal nanoparticles. Also, the most desirable molecular weight may be dependent on the metal. By way of non-limiting example, in the case of polyvinylpyrrolidone, a particularly preferred weight average molecular weight is in the range of from about 3,000 to about 60,000, in particular if the metal comprises silver.

The inventors have surprisingly found that the process for the production of metal nanoparticles in accordance with the present invention can be optimized by controlling the conformation of the polymer of vinylpyrrolidone. The inventors have found that the more "open" the conformation of the polymer of vinylpyrrolidone, the more viscous is the reaction mixture. A more viscous reaction mixture leads to the minimization of particles having a size of about 0.2 µm or above. The conformation of the polymer of vinylpyrrolidone can be influenced to become more "open" by, e.g., the addition of inorganic or organic salts. Without being bound by any particular theory, it is believed that the addition of anions and cations to the reaction mixture reduces repulsive electrostatic interactions between (a) functional groups on the polymer of vinylpyrrolidone (intramolecular), (b) polymer of vinylpyrrolidone molecules (intermolecular) and/or the solvent, thereby influencing the polymer of vinylpyrrolidone to become more "open." Examplary inorganic salts include NaCl, $(NH_4)_2CO_3$, and $NH_4NO_3$. The addition of hydrogen-bonding inhibitors can also influence the polymer of vinylpyrrolidone to become more "open." A non-limiting example of a hydrogen bonding inhibitor includes urea. The blending of higher molecular weight polymers of vinylpyrrolidone can also influence the lower molecular weight polymer of vinylpyrrolidone to become more "open." For example, blending of a higher molecular weight polymer (e.g., Plasdone K-25, Plasdone K-29/32, and Luvitec K-30) with a lower molecular weight polymer (e.g., Plasdone K-15) influences the lower molecular weight polymer to be more "open." Sparging the reaction mixture with $CO_2$ can also influence the lower molecular weight polymer of vinylpyrrolidone to become more "open." While not being bound by any particular theory, it is believed that sparging the reaction mixture with $CO_2$ promotes the formation of $CO_3^{2-}$ anions in the reaction mixture. And, as alluded to above, the carbonate anion can reduce the repulsive electrostatic interactions in the reaction mixture thereby influencing the polymer of vinylpyrrolidone to become more "open." Finally, blending of different polyols (e.g., propylene glycol blended with higher carbon polyols) can influence the polymer of vinylpyrrolidone to become more "open."

Non-limiting specific examples of polymers of vinylpyrrolidone for use in the present invention include homo- and copolymers of vinylpyrrolidone which are commercially available from, e.g., International Specialty Products (www.ispcorp.com). In particular, these polymers include:
(a) vinylpyrrolidone homopolymers such as, e.g., grades K-15 and K-30 with K-value ranges of from 13-19 and 26-35, respectively, corresponding to average molecular weights (determined by GPC/MALLS) of about 10,000 and about 67,000;
(b) alkylated polyvinylpyrrolidones such as, e.g., those commercially available under the trade mark GANEX® which are vinylpyrrolidone-alpha-olefin copolymers that contain most of the alpha-olefin (e.g., about 80% and more) grafted onto the pyrrolidone ring, mainly in the 3-position thereof; the alpha-olefins may comprise those having from about 4 to about 30 carbon atoms; the alpha-olefin content of these copolymers may, for example, be from about 10% to about 80% by weight;
(c) vinylpyrrolidone-vinylacetate copolymers such as, e.g., random copolymers produced by a free-radical polymerization of the monomers in a molar ratio of from about 70/30 to about 30/70 and having weight average molecular weights of from about 14,000 to about 58,000;
(d) vinylpyrrolidone-dimethylaminoethylmethacrylate copolymers;
(e) vinylpyrrolidone-methacrylamidopropyl trimethylammonium chloride copolymers such as, e.g., those commercially available under the trade mark GAFQUAT®;
(f) vinylpyrrolidone-vinylcaprolactam-dimethylaminoethylmethacrylate terpolymers such as, e.g., those commercially available under the trade mark GAFFIX®;
(g) vinylpyrrolidone-styrene copolymers such as, e.g., those commercially available under the trade mark POLECTRON®; a specific example thereof is a graft emulsion copolymer of about 70% vinylpyrrolidone and about 30% styrene polymerized in the presence of an anionic surfactant; and
(h) vinylpyrrolidone-acrylic acid copolymers such as, e.g., those commercially available under the trade mark ACRYLIDONE® which are produced in the molecular weight range of from about 80,000 to about 250,000.

In an optional embodiment, the polymer of vinylpyrrolidone is treated, e.g., heated, before it is formulated into the first solution used in the processes of the present invention. Preferably, the polymer of vinylpyrrolidone is heated in powder form, although it is also contemplated that the polymer of vinylpyrrolidone may be heated in wet cake form or in solution in an organic solvent. Heating of the polymer of vinylpyrrolidone is highly desirable in situations where neither a reducing agent (e.g., a non-polyol reducing agent) nor a base is used in the processes of the present invention, although a step of heating the polymer may also be performed in those embodiments in which a reducing agent (e.g., a non-polyol reducing agent) and/or a base is included within the first solution. Heating the polymer of vinylpyrrolidone serves to reduce the amount of water and/or alter the polymer capping characteristics in a way that leads to improved association (e.g., binding) of polymer with the metal particles, e.g., nanoparticles, and therefore substantially reduced agglomeration and/or excessive growth, and hence better control of particle size, shape and particle size distribution. Heating of the polymer may also reduce the concentration of other volatile materials that may be comprised in the polymer as either a byproduct of the process by which the polymer is made or as an additive (e.g., chemical compounds added to the polymer to help buffer aqueous solutions of the polymer when the polymer is used in a biomedical application or in pharmaceutical formulations) that may be added to the polymer after it is synthesized by the commercial supplier. In this context, the term "volatile material" means low molecular weight components that can be easily removed when polymer is heated to from about 100° C. to about 120° C. It is also possible that heating the polymer may also contribute to morphological and/or chemical changes in the polymer that improves the characteristics of the polymer when it is subsequently used (i.e., after heating) in the processes of the present invention. It is important, however, not to heat the polymer to such a temperature that the polymer begins to decompose.

The specific heating conditions that should be employed may vary widely, depending, for example, on the quality of the polymer of vinylpyrrolidone and the amount and type of contaminants contained therein. In a preferred aspect, the heating comprises heating the polymer of vinylpyrrolidone to a temperature from about 70° C. to about 120° C., e.g., from about 80° C. to about 120° C., from about 90° C. to about 110° C., or to a temperature of about 100° C. The temperature optionally is sustained for more than about 8 hours, more than about 12 hours, more than about 24 hours, more than about 36 hours, more than about 72 hours, more than about 100 hours, more than about 120 hours, or more than about 150 hours. In terms of ranges, the temperature optionally is sustained for from about 12 hours to about 150 hours, e.g., from about 24 to about 120 hours, from about 24 to about 100 hours, from about 36 to about 72 hours, from about 48 to about 84 hours, or from about 72 to about 150 hours.

In various embodiments, the volatile material content (e.g., formic acid, ammonium formate, physically adsorbed water, or others) of the polymer before it is heated is from about 0.01 to about 10% by weight of polymer (including the weight of the contaminants contained therein), or from about 0.01 to about 5% by weight, or from about 0.01 to about 4% by weight or about 3% by weight of polymer. In some embodiments, the polymer is heated at a temperature and time period sufficient to reduce the amount of volatile materials by at least about 20%, e.g., at least about 40%, at least about 50%, or at least about 60%, based on the amount of volatile materials contained in the polymer before the heating. In some embodiments, the polymer is heated at a temperature and time period sufficient to reduce the amount of volatile materials (formic acid, ammonium formate, physically adsorbed water, others) in the polymer to less than about 6% by weight of polymer, e.g., at less than about 5% by weight, at less than about 4% by weight, less than about 3.5% by weight or less than about 3% by weight of polymer. As a non-limiting example, the polymer may be heated at 70° C. for about 12 hours whereby the amount of volatile materials may be reduced by about 20% to about 40%. In another non-limiting example, the polymer may be heated at 100° C. for about 36 hours, whereby the amount of volatile materials may be reduced by greater than about 40%, e.g., greater than about 50% or greater than about 60%. In a preferred embodiment, the polymer comprises less than about 6 wt. %, less than about 5 wt. % or less than about 4 wt. % volatile materials.

The water content of the polymer before it is heated may be from about 1 to about 10% by weight, from about 1 to about 8% by weight, from about 2 to about 10% by weight or from about 2 to about 7% by weight. In some embodiments, the polymer is heated at a temperature and time period sufficient to reduce the amount of water in the polymer by at least about 20%, e.g., at least about 30%, at least about 40%, at least about 45%, at least about 50% or at least about 60%, based on the amount of water present in the polymer before the heating. In some embodiments, the polymer is heated at a temperature and time period sufficient to reduce the amount of water in the polymer to less than about 10 weight percent water, e.g., less than about 8 weight percent water, less than about 6 weight percent water, less than about 4 weight percent water or less than about 2 weight percent water. As a non-limiting example, the polymer may be heated at 100° C. for 36 hours, whereby the amount of water in the polymer is reduced to less than about 2% by weight of polymer.

Optionally, the heating occurs under a partial vacuum, e.g., less than about 700 ton, less than about 600 torr, or less than about 500 torr. Alternatively, the heating may occur in the presence of an atmosphere. In some embodiments, the atmosphere comprises air or an inert gas (e.g., helium, argon, nitrogen and the like) that is either stagnant or that is flowed over the surface of the polymer of vinylpyrrolidone. In other embodiments, the polymer of vinylpyrrolidone is first dissolved in a solvent (e.g., ethylene glycol) and the resulting solution is heated while it sparged with air or an inert gas. The temperature of the solution is optionally at least about 60° C., for example, at least about 70° C., at least about 80° C., at least about 85° C., at least about 90° C., at least about 100° C., at least about 110° C., or at least about 120° C. On the other hand, the temperature of solution optionally is not higher than about 180° C., e.g., not higher than about 170° C., not higher than about 160° C., not higher than about 150° C., not higher than about 140° C., or not higher than about 130° C. In terms of ranges, the solution preferably has a temperature of from about 100° C. to about 140° C., e.g., from about 110° C. to about 130° C., from about 115° C. to about 125° C., or about 120° C.

Details regarding the formulation and properties of printable inks comprising vinyl pyrrolidone polymers are disclosed in Published U.S. patent application US 2006/0189113 A1, entitled "Metal Nanoparticle Compositions," the entire disclosure of which is incorporated by reference herein.

Solvent for Metal Precursor

Preferably, the second solution comprises a solvent in which the metal precursor is dissolved. A single solvent or a mixture of two or more solvents/diluents (collectively referred to herein as "solvent" or "solvent for the metal precursor") can be used.

As mentioned above, in a preferred aspect of the method of the present invention, the solvent for the metal precursor in the second solution is or at least comprises one or more polyols, preferably the same polyol(s) that is/are present in the first solution. It is noted however, that the use of one or more polyols for dissolving the metal precursor is not required. Other solvents may be used as well, such as, e.g., protic solvents. Non-limiting examples of such solvents include aliphatic, cycloaliphatic and aromatic alcohols (the term "alcohol" as used herein is used interchangeably with the terms "monoalcohol" and "monohydric alcohol") such as, e.g., ethanol, propanol, butanol, pentanol, cyclopentanol, hexanol, cyclohexanol, octanol, decanol, isodecanol, undecanol, dodecanol, benzyl alcohol, butyl carbitol and the terpineols, ether alcohols such as, e.g., the monoalkyl ethers of diols such as, e.g., the $C_{1-6}$ monoalkyl ethers of $C_{1-6}$ alkanediols and polyetherdiols derived therefrom (e.g., the monomethyl, monoethyl, monopropyl and monobutyl ethers of ethylene glycol, diethylene glycol, triethylene glycol, propylene glycol, dipropylene glycol, 1,3-propanediol, and 1,4-butanediol such as, e.g, 2-methoxyethanol, 2-ethoxyethanol, 2-propoxyethanol and 2-butoxyethanol), aminoalcohols such as, e.g., ethanolamine, amides such as, e.g., dimethylformamide, dimethylacetamide 2-pyrrolidone and N-methylpyrrolidone, esters such as, e.g., ethyl acetate and ethyl formate, sulfoxides such as, e.g., dimethylsulfoxide, ethers such as, e.g., tetrahydrofuran and tetrahydropyran, and water. These and other suitable solvents may be used alone or as a mixture of two or more thereof and/or in combination with one or more polyols. By the same token, it is possible for the second solution to comprise one or more solvents in addition to the one or more polyols included therein.

Temperature

The temperature of the heated first solution is preferably at least about 60° C., for example, at least about 70° C., at least about 80° C., at least about 85° C., at least about 90° C., at least about 100° C., at least about 110° C., or at least about 120° C. On the other hand, the temperature of the heated first solution preferably is not higher than about 180° C., e.g., not higher than about 170° C., not higher than about 160° C., not higher than about 150° C., not higher than about 140° C., or not higher than about 130° C. In terms of ranges, the heated first solution preferably has a temperature of from about 100° C. to about 140° C., e.g., from about 110° C. to about 130° C., from about 115° C. to about 125° C., or about 120° C. The most suitable temperature of the heated first solution is at least in part determined by factors such as the boiling point of the solvent(s) included therein (i.e., the boiling point of at least the polyol), the thermal stability of the polymer of vinylpyrrolidone, the reactivities of the metal precursor, the polyol and the non-polyol reducing agent (if present), and the temperature of the second solution and the volume thereof relative to the heated first solution.

The temperature of the second solution used in the process of the present invention, i.e., the solution of the metal precursor, will usually be not higher than that of the heated first solution and will frequently be not higher than about 50° C., e.g., not higher than about 40° C., or not higher than about 30° C. On the other hand, too low a temperature may increase the viscosity of the second solution and/or reduce the solubility of the metal precursor to an undesirable degree. Usually, the temperature of the second solution will be about room temperature. In a preferred aspect of the process of the present invention, the temperature of the solution of the metal precursor will be not substantially higher than about 40° C. and the heated first solution will be at a temperature of at least about 80° C. In other embodiments, the temperature of the heated first solution is not higher than about 50° C., e.g., not higher than about 40° C., or not higher than about 30° C., and the temperature of the second solution optionally is not higher than about 50° C., e.g., not higher than about 40° C., or not higher than about 30° C. Immediately upon mixing of the heated first solution and the second solution, however, the reaction mixture is passed through a heat exchanger that rapidly raises the temperature of the reaction mixture to at least about 60° C., for example, at least about 70° C., at least about 80° C., at least about 85° C., at least about 90° C., at least about 100° C., at least about 110° C., or at least about 120° C. On the other hand, the temperature of the reaction mixture is not higher than about 180° C., e.g., not higher than about 170° C., not higher than about 160° C., not higher than about 150° C., not higher than about 140° C., or not higher than about 130° C. In terms of ranges, the reaction mixture preferably has a temperature of from about 100° C. to about 140° C., e.g., from about 110° C. to about 130° C., from about 115° C. to about 125° C., or about 120° C.

Proton Concentration

The proton concentration of the first and second solutions as well as of the reaction mixture will vary depending on whether the process employs a base as well as on the acidity of the reducing agent (e.g., a non-polyol reducing agent), if present. The proton concentration of the first and second solutions prior to mixing can be determined by methods that are well known in the art. One way that the proton concentration of each solution can be measured, for example, is by withdrawing an aliquot of solution and diluting the aliquot with water to give a first aqueous solution (in the case of the first heated solution) or a second aqueous solution (in the case of the second solution comprising the polyol and metal precursor). The pH of the first and/or second aqueous solutions is then measured with a pH-meter (e.g., a pH meter from Oakton pH 2100 series). For purposes of the present specification, a 5 mL aliquot of solution is withdrawn and is diluted with 95 mL of deionized water to make a 100 mL total volume aqueous solution. The pH of the aqueous solution is then measured.

In those embodiments that do not employ a base in the first solution, the heated first solution comprising the polymer of vinyl pyrrolidone should, nevertheless, not have a high proton concentration (e.g., have a corresponding first aqueous solution with a pH that is about 2 or less), and may be basic. If the heated first solution is strongly acidic (e.g., having a corresponding first aqueous solution with a pH of about 2 or less), decomposition of the polymer of vinylpyrrolidone may result. In some embodiments, the pH of the first aqueous solution is from about 3 to about 7, e.g., from about 3.5 to about 5, from about 3.5 to about 6 or from about 4 to about 6. In other embodiments, the pH of the first aqueous solution is from about 6 to about 12, e.g., from about 7 to about 11, from about 8 to about 12, from about 9 to about 12 or from about 9 to about 11. In a preferred embodiment, the pH of the first aqueous solution is about 11.

Ideally, the pH of the second aqueous solution is similar to the pH of the first aqueous solution comprising the polymer of vinyl pyrrolidone before the two solutions are mixed. Generally speaking, however, the pH of the second aqueous solution should not be strongly acidic (e.g., having a pH that is about 2 or less) and, in some embodiments, it is neutral or slightly basic. In some embodiments, the pH of the first aqueous solution is from about 3 to about 7, e.g., from about 3.5 to about 5, from about 3.5 to about 6 or from about 4 to about 6. In other embodiments, the pH of the first aqueous solution is from about 6 to about 12, e.g., from about 7 to about 11, from about 8 to about 12, from about 9 to about 12 or from about 9 to about 11. In a preferred embodiment, the pH of the first aqueous solution is between about 7 and about 9.

As discussed above, in some embodiments of the present invention a base is included in the first solution. Since bases are electron rich, it is possible that base in the reaction mixture may act as a reducing agent (e.g., a non-polyol reducing agent), which facilitates the formation of the metal nucei and/or metal nanoparticles from the metal precursor.

Mixing

The rate at which the heated first solution and the second solution comprising the metal precursor are combined in the processes of the present invention is preferably as high as possible. By way of non-limiting example, the two solutions will usually be completely combined within not more than about 5 minutes, preferably within not more than about 2 minutes, e.g., within not more than about 1 minute, within not more than about 30 seconds, within not more than about 15 seconds, or within not more than about 5 seconds. Most preferably, the solutions are combined virtually instantaneously, such as by a one-shot addition of one of the solutions to the other solution, e.g., by a one-shot addition of the solution of the metal precursor to the heated first solution.

It is also preferred according to the present invention to promote the complete mixing of the two solutions, for example, by agitation such as, e.g., by (preferably vigorous) stirring, shaking and/or sonication of the combined solutions. Optionally, the solutions are contacted and mixed in-stream in a stoichiometric fashion (e.g., in a static mixer), and the resulting mixture agitated intensely in a reactor for the duration of reaction. Reaction agitation power per reaction volume is optionally at least about 0.01 horsepower per gallon of reaction volume (hp/gal) (1.96 W/L), e.g., at least about 0.1 hp/gal (19.6 W/L), at least about 0.2 hp/gal (39.3 W/L), at least about 0.3 hp/gal (58.9 W/L) or at least about 0.4 hp/gal (78.5 W/L). In terms of upper limits, optionally in combination with the aforementioned lower limits, the rate at which the solutions are mixed is less than about 2 hp/gal (393 W/L), e.g., less than about 1.5 hp/gal (294 W/L), less than about 1 hp/gal (196 W/L), or less than about 0.75 hp/gal (147 W/L). In a preferred embodiment, the rate at which the solutions are mixed is about 0.43 hp/gal (84.4 W/L). For example, when the reaction is conducted in a 6 gallon (1.6 L) batch size, the time at which the entirety of the two solutions are mixed in-stream in a static mixer preferably is 6 minutes and the agitation of the subsequent mixture in the reactor is preferably from about 100 to about 150 rpm (e.g., using a 12 inch diameter, 2 inch wide, 3-blade retreat curve impeller).

In a preferred embodiment, the first and second solutions are mixed in a static mixer. In other embodiments, the first and second solutions are mixed as part of a continuous flow process (e.g., in a plug/pipe flow reactor (PFR), a continuos stirred tank reactor (CSTR), a membrane reactor, a microfabricated plate reactor (MFP), a microjet reactor (MJR), an aerosol flow reactor (AFR), a laminar flow reactor (LFR), a segmented flow reactor (SFR), a packed column reactor (PCR), and combinations of two or more of the aforementioned reactors). In some embodiments, particularly in large commercial applications, the solution of the metal precursor and the heated first solution are combined at the junction of one or more conduits that lead into the vessel (e.g., a jacketed reaction vessel) where the reaction will run to completion. Thus, for example, the solution of the metal precursor can be prepared in a first tank, while the heated first solution can be prepared in a separate second tank. Both first and second tanks are connected to a reaction vessel via a first and a second conduit made of a suitable material (e.g., Tygon®, stainless steel, glass and PVC tubing). The first and second conduits are joined via a suitable joint (e.g., a T- and a Y-joint) located proximally, distally or somewhere in between relative to the first and second tanks and the reaction vessel. There is a third conduit that leads from the joint to the reaction vessel.

The first and second tanks comprise first and second valves, respectively, located on the first and second conduits. The first and second valves seal the first and second tanks, respectively, off from the reaction vessel. At the desired time, the first and second valves are opened thereby allowing the solution of the metal precursor from the first tank and the heated first solution from the second tank to flow through the first and second conduits in the direction of the joint and the reaction vessel. When the solution of the metal precursor and the heated first solution meet at the junction they will mix thereby producing a reaction mixture. The reaction mixture subsequently flows from the junction, into the third conduit and then into the reaction vessel. Optionally, the reaction mixture will flow into a static mixer to rapidly mix reagents in the third conduit and then into the reaction vessel. Once in the reaction vessel, the reaction may be mixed further, for example, by agitation such as, e.g., by (preferably vigorous) stirring, shaking and/or sonication of the combined solutions (i.e., the reaction mixture).

In some embodiments, the ratio of the feed rate of the first solution to the feed rate of the second solution is carefully controlled, for example, to match reaction stoichiometry. The ratio of the feed rate of the second solution (comprising the metal precursor) to the feed rate of the first solution optionally is at least about 0.03, e.g., at least about 0.06, at least about 0.12, at least about 0.15 or at least about 0.18. In terms of upper limits, optionally in combination with the aforementioned lower limits, the ratio of the feed rate of the second solution to the feed rate of the first solution is less than about 0.72, e.g., less than about 0.54, less than about 0.36, or less than about 0.27. In a preferred embodiment, the ratio of the feed rate of the second solution to the feed rate of the first solution is about 0.18.

Once the reaction is complete, the reaction is quenched by, e.g., cooling the reaction to a quenching temperature, where the quenching temperature is preferably below about 80° C., e.g., below about 70° C., below about 60° C., or below about 50° C. In a preferred embodiment, the reaction is cooled to about 60° C. The quenching may be accomplished by cooling the reaction vessel to the quenching temperature. Alternatively, the quenching may be accomplished by passing the reaction mixture through a heat exchanger. Thus, for example, the reaction vessel may comprise a reaction vessel valve that is connected to a reaction vessel conduit that is separate from the third conduit. The reaction vessel conduit, in turn, can be connected to a heat exchanger (e.g., a conduit that is liquid cooled). The heat exchanger can be arranged such that it empties into a containment vessel where the quenched reaction mixture is held prior to the processing steps where the metal nanoparticles are collected.

Ratio of Metal Precursor and Polymer of Vinylpyrrolidone

The most desirable ratio of the metal precursor and the polymer of vinylpyrrolidone is a function of a variety of factors. In this regard, it is to be appreciated that the polymer of vinylpyrrolidone will generally have multiple functions. These functions include, of course, a substantial prevention of an agglomeration of the nanoparticles and, as a result thereof, facilitating an isolation of the nanoparticles from the reaction mixture, ensuring a substantial redispersibility of the isolated nanoparticles and a stabilization of dispersions comprising these nanoparticles. Another function of the polymer of vinylpyrrolidone usually comprises assisting in the control of the size and shape of nanoparticles during the reduction of the metal precursor. For example, if the amount of polymer of vinylpyrrolidone is not sufficient to shield the growing nanoparticles completely, the formation of particles with a high aspect ratio such as, e.g., nanorods and/or nanowires and/or irregularly shaped particles may be observed. It has been found that under otherwise identical conditions, the rapid mixing of the heated first solution with the second solution comprising the metal precursor according to the processes of the present invention allows to obtain substantially the same results with respect to the control of the size, the size distribution and/or the shape of the particles as the known method with its gradual dissolution/reaction of the metal precursor in the presence of polymer of vinylpyrrolidone, but at a (substantially) lower molar ratio of the polymer of vinylpyrrolidone and the metal precursor than required in the known method. In any event, the polymer of vinylpyrrolidone should be present in at least the amount that is sufficient to substantially prevent an agglomeration of the nanoparticles. This amount is at least in part dependent on the size of the metal cores of the formed nanoparticles.

It has also been discovered that the amount of the polymer of vinylpyrrolidone, e.g., PVP, employed in the reaction mixture relative to the amount of metal precursor may significantly impact the ultimate conductivity of any conductive features formed from the nanoparticles formed by the processes of the present invention. Thus, in one embodiment, the metal nanoparticles are formed into a conductive feature, and the amount of the polymer of vinylpyrrolidone relative to the amount of metal precursor that is employed in the process is selected to provide a desired conductivity for the conductive feature. Specifically, decreasing the polymer of vinylpyrrolidone content in the reaction mixture (relative to metal precursor concentration) leads to increased bulk conductivity (decreased resistivity) of features formed from the nanoparticles, and vice versa. Thus, the conductivity of features formed from the nanoparticles may be carefully "dialed in" based on the ratio of polymer of vinylpyrrolidone:metal precursor employed.

The molar ratio in the reaction mixture of the monomer units of the polymer (and preferably of only those monomer units that are capable of being adsorbed on the nanoparticles) and the metal optionally is at least about 3:1, e.g., at least about 4:1, at least about 5:1, at least about 6:1, at least about 8:1, or at least about 10:1. However, for practical reasons (in particular in view of the viscosity increasing effect of certain polymers) and for reasons of economic efficiency (excess polymer of vinylpyrrolidone, i.e., polymer that will not be adsorbed may have to be removed and discarded/recycled later) this ratio will usually be not higher than about 100:1, e.g., not higher than about 80:1, not higher than about 50:1, not higher than about 30:1, or not higher than about 20:1.

The volume ratio of the first solution to the second solution will depend on factors such as the concentration of the polymer in the first solution and the concentration of the metal precursor in the second solution. Optionally, the volume ratio of the first solution to the second solution is from about 2:1 to about 6:1, e.g., from about 3:1 to about 5:1, or from about 3.5:1 to about 4.5:1. Preferably the ratio is about 4:1.

Reaction Time and Temperature

In the processes of the invention in which a reducing agent (e.g., a non-polyol reducing agent) and/or a base is employed in the first solution, the formation of metal nuclei will occur relatively quickly, typically on the order of a few seconds or minutes (e.g., 2 seconds to 5 minutes). The reaction between the metal precursor and the polyol in the growth phase, which, in turn, produces the metal nanoparticles, runs to completion after a few minutes or hours (e.g., ten to 120 minutes). Typically, a substantial percentage of the employed metal precursor is converted to metal nanoparticles at a reaction temperature between about 115° C. and about 130° C. in from about 30 to about 180 minutes, e.g., from about 60 to about 120 minutes, from about 30 to about 120 minutes or from about 90 to about 180 minutes.

The reaction rate depends, inter alia, on the temperature at which the mixed solutions are kept, and the reactivities of the metal precursor, the reducing agent (e.g., a non-polyol reducing agent, if present), the base (if present) and the polyol. The temperature at which the reaction is conducted correlates with the size of the particles ultimately formed, and, as a result, the temperature of the reaction process from the beginning to the end should be carefully controlled. Control of the reaction temperature is desirable because if the reaction temperature is allowed to go beyond a certain point, the size and quality of the metal nanoparticles produced in the process of the present invention may be adversely affected. For example, if the reaction temperature is allowed to go above 130° C., the size of the metal nanoparticles produced in the process of the present invention may be too large (e.g., greater than 200 nm, greater than 300 nm, greater than 400 nm, greater than 500 nm or greater than 1 μm). On the other hand, if the reaction temperature is too low, the reaction may not occur at all, may occur only partially or may take an unreasonably long time to occur. In addition, if the reaction temperature is too low, poor conversion of the metal precursor to metal nanoparticles may result.

It will usually be advantageous to heat the mixed solutions to an elevated temperature (if they are not at the desired temperature already), since no appreciable particle formation occurs at room temperature (e.g., about 75° C.). Further, it is usually advantageous to keep the solutions at an elevated temperature for a sufficient period to convert at least a substantial portion of, and preferably substantially the entire metal precursor (e.g., at least about 90%, or at least about 95% thereof) to metal nanoparticles. The temperature that is needed to achieve a desired degree of conversion within a predetermined period of time depends, inter alia, on the reactivities and concentrations of the reactants. Of course, the reaction temperature should not be so high as to cause a more than insignificant decomposition of the various components of the reaction mixture (e.g., of the polymer of vinylpyrrolidone). Also, the temperature will usually be not significantly higher than the boiling point of the lowest-boiling component of the reaction mixture, although this is not required, especially if the reaction mixture is kept under a higher than atmospheric pressure, e.g., in an autoclave. In many cases, the reaction mixture will be heated to/kept at a temperature of at least about 80° C., e.g., at least about 90° C., at least about 100° C., at least about 110° C., or at least about 120° C. On the other hand, it will usually be advantageous for the temperature of the reaction mixture to not exceed about 200° C., e.g., to not exceed about 180° C., to not exceed about 160° C., to not exceed about 150° C., or to not exceed about 140° C. or to not exceed about 130° C. In some embodiments, it is desirable that the reaction temperature be kept below 130° C. In other embodiments, it is desirable that the reaction temperature be kept at 120±5° C. In still other embodiments, the reaction temperature, particularly during and after the mixing of the solution of the metal precursor and the heated first solution, should not be allowed to go below 110° C., e.g., not below 100° C., not below 103° C., not below 105° C., or not below 109° C.

In some cases, the reaction that produces the metal nanoparticles is exothermic. When the reaction is exothermic, reaction temperature control is particularly important, since the reaction temperature may exceed the optimal temperature (e.g., not higher than 130° C., not higher than 125° C., not higher than 120° C., or not higher than 115° C.) for the formation of particles that are within a desired size or size range (e.g., from about 20 to about 120 nm, about 60 to about 100 nm or about 80 to about 100 nm). Thus, if the reaction exotherms and the temperature is allowed to go above, e.g., 130° C., the size of the metal nanoparticles produced in the process of the present invention may be too large (e.g., greater than 200 nm, greater than 300 nm, greater than 400 nm, greater than 500 nm or greater than 1 μm).

Reaction Atmosphere

In order to minimize side reactions, it may be advantageous to conduct the reaction that produces the metal nanoparticles under an inert atmosphere (e.g., under Ar and nitrogen gas); that is, under conditions where the head-space of the reaction vessel is kept under a static inert atmosphere (i.e., an inert gas is not continuously flushing the head-space of the reaction vessel). In other embodiments, the head-space of the reaction vessel is kept under a static air atmosphere. In some embodiments, however, the head-space of the reaction vessel can be continuously flushed with either an inert gas or with air.

It can also be advantageous to sparge the reaction mixture with an inert gas (e.g., Ar and $N_2$), in which case the reaction is conducted under an inert atmosphere as a consequence of the sparging. In some embodiments, the reaction mixture can be sparged with air or oxygen. In yet other embodiments, the heated first solution and/or the second solution comprising the metal precursor can be kept under an inert atmosphere (e.g., under Ar and nitrogen gas) prior to their mixing and/or they can be sparged with an inert gas (e.g., Ar and $N_2$). Alternatively, the heated first solution and/or the second solution comprising the metal precursor can be sparged with air or oxygen. The amount of oxygen in the reaction solution may have an influence on the stability of freshly formed metal nuclei, e.g., silver nuclei, due to oxidative etching, and may influence particle size, shape and PSD. Further, sparging of the reaction mixture with an inert gas, air or oxygen can facilitate removal of $NO_x$ compounds (e.g., NO, $NO_2$ when the metal precursor counterion is nitrate) from the reaction mixture. Such $NO_x$ compounds may be derived, for example, from the anion component (e.g., nitrate anion) of the metal precursor.

When one or more of the reaction mixture and/or the heated first solution and/or the second solution are sparged, they optionally are sparged for from about 15 minutes to about 90 minutes, e.g., from about 15 minutes to about 60 minutes, or from about 15 minutes to about 30 minutes. In some embodiments, the reaction mixture is sparged from the moment that the reaction begins (e.g., upon mixing of the first and second solutions) to the moment the reaction mixture is quenched. Optionally, the heated first solution and/or the second solution is sparged for at least 15 minutes, at least 30 minutes, at least 45 minutes or at least 60 minutes before the mixing of the first and second solutions.

When one or more of the reaction mixture and/or the heated first solution and/or the second solution are sparged with air, they optionally are sparged at a rate of at least about 800 standard cubic centimeters per minute (sccm), e.g., at least about 700 sccm, at least about 600 sccm, at least about 500 sccm or at least about 400 sccm. In terms of upper limits, optionally in combination with the aforementioned lower limits, the sparging rate is less than about 1000 sccm, e.g., less than about 900 sccm, or less than about 800 seem. In a preferred embodiment, the sparging rate for air is about 500 sccm.

As mentioned above, it can be advantageous to conduct the reaction that produces the metal nanoparticles under (i) an inert atmosphere (e.g., under Ar and $N_2$ gas) such that the head-space of the reaction vessel is continuously flushed with an inert gas; or (ii) an air atmosphere such that the head-space of the reaction vessel is continuously flushed with air. The head-space of the reaction vessel may be flushed with either an inert gas or air before, during or after one or more of the reaction mixture and/or the heated first solution and/or the second solution are sparged, as described above. When the head-space of the reaction vessel is flushed with an inert gas or with air, the head-space is flushed at a rate of at least about 1 standard cubic centimeters per minute per gallon of reaction volume (sccm/gal) (0.26 sccm/L), e.g., at least about 5 sccm/gal (1.3 sccm/L), at least about 10 sccm/gal (2.6 sccm/L), at least about 20 sccm/gal (5.3 sccm/L) or at least about 40 sccm/gal (10.5 sccm/L). In terms of upper limits, optionally in combination with the aforementioned lower limits, the flushing rate is less than about 300 sccm/gal (79 sccm/L), e.g., less than about 150 sccm/gal (39 sccm/L), less than about 100 sccm/gal (26 sccm/L), or less than about 50 sccm/gal (13 sccm/L). In a preferred embodiment, the flushing rate is about 16 sccm/gal (4.2 sccm/L). For example, when the reaction is performed using a 6 gallon (1.6 L) batch size, the head-space of the reaction vessel can be flushed with $N_2$ or air at a rate of 100 sccm.

Optional Real-Time Monitoring of the Reaction

In an optional embodiment, the reaction by-products, reaction products, etc. can be monitored to understand how the reaction is proceeding. The monitoring of the reaction can be accomplished by the use of instrumentation to monitor reaction parameters including, e.g., the reaction temperature (e.g., exotherm and endotherm), the volume/concentration/composition of off-gas evolved during the reaction, and reactor pressure. The reaction conditions can then be adjusted accordingly, if necessary, to create reaction conditions that drive the reaction toward the production of metal nanoparticles of desired size, size distribution and/or shape.

Optional Further Processing

Once the desired degree of conversion of the metal precursor is achieved the reaction mixture is preferably cooled to room temperature. Cooling can be accomplished in any suitable manner, e.g., by cooling the reaction vessel with a cooling medium such as, e.g., water (forced cooling). Further, the reaction mixture may simply be allowed to cool to room temperature in the ambient atmosphere.

Preferably after the cooling of the reaction mixture to room temperature the formed nanoparticles may be separated from the liquid phase of the reaction mixture. This can be accomplished, for example, in the various ways of separating a solid from a liquid that are known to those of skill in the art. Non-limiting examples of suitable separation methods include filtration (at room temperature or below or, optionally, at an elevated temperature), centrifugation, chromatographic methods, electrophoretic techniques, precipitation with a nano-particle precipitating substance, etc. Preferably, the separation process includes a precipitation step in which a nanoparticle-precipitating material, e.g., comprising a polar aprotic solvent such as, e.g., a ketone such as acetone, is used to facilitate precipitation of the nanoparticles. Separation of nanoparticles is further described in U.S. patent application Ser. No. 11/331,238 filed Jan. 13, 2006, the entirety of which is incorporated herein by reference.

After separation, the nanoparticles preferably are subjected to a washing operation to remove at least a substantial portion of the impurities that may still be associated therewith such as, e.g., materials that are not adsorbed on the surface of the nanoparticles to any significant extent.

Metal Nanoparticles

The inventive processes of the present invention advantageously provide the ability to control the size, the size distribution and/or the shape of the nanoparticles formed even on a large scale. For example, particles which exhibit a high degree of uniformity in size and/or shape may be produced by the processes of the present invention. In particular, the processes of the present invention are capable of affording particles with a substantially spherical shape. In one aspect of the present invention, at least about 90%, e.g., at least about 95% of the nanoparticles formed by the processes of the present invention may be of a substantially spherical shape.

As discussed above, the amount of polymer of vinyl pyrrolidone employed in the reaction mixture may impact the morphology of the nanoparticles formed. Generally, the greater the concentration of the polymer of vinyl pyrrolidone (e.g., PVP) contained in the reaction mixture, the more spherical the nanoparticles will be. Optionally, the molar ratio of monomer units of the polymer of vinylpyrrolidone, e.g., PVP, to metal precursor, e.g., $AgNO_3$, is greater than about 2.0, greater than bout 2.5, or greater than about 3.0. Generally, at molar ratios that are less than about 2.5, e.g., less than about 2.0, or less than about 1.5, the amount of rods and wires formed relative to spherical particles increases.

In another aspect, the particles may be substantially free of micron-size particles (i.e., particles having a size of about 1 μm or above). Even more preferably, the nanoparticles may be substantially free of particles having a size (=largest dimension, e.g., diameter in the case of substantially spherical particles) of more than about 500 nm, e.g., of more than about 200 nm, or of more than about 100 nm. Preferably, less than about 5% of particles (e.g., less than about 3%, less than about 2% or less than about 1% of particles) are greater than 500 nm (large particle count (LPC)). In this regard, it is to be understood that whenever the size and/or dimensions of the nanoparticles are referred to herein and in the appended claims, this size and these dimensions refer to the nanoparticles without polymer of vinylpyrrolidone thereon, i.e., the metal cores of the nanoparticles. Depending on the type and amount of polymer of vinylpyrrolidone, an entire nanoparticle, i.e., a nanoparticle which has the polymer of vinylpyrrolidone thereon, may be significantly larger than the metal core thereof. Also, the term "nanoparticle" as used herein and in the appended claims encompasses particles having a size/largest dimension of the metal cores thereof of up to about 900 nm, preferably of up to about 500 nm. By way of non-limiting example, not more than about 5%, e.g., not more than about 2%, not more than about 1%, or not more than about 0.5% of the particles that are formed by the processes of the present invention may be particles whose largest dimension (e.g., diameter) is larger than about 300 nm, e.g., larger than about 200 nm, larger than about 150 nm, or larger than about 100 nm. In a particularly preferred aspect, at least about 95% of the nanoparticles may have a size of not larger than about 80 nm and/or at least about 80% of the nanoparticles may have a size of from about 30 nm to about 70 nm.

In another aspect, the nanoparticles formed by the processes of the present invention may have an average particle size (expressed as number average) of at least about 10 nm, e.g., at least about 20 nm, or at least about 30 nm, but preferably not higher than about 120 nm, e.g., not higher than about 100 nm, not higher than about 80 nm, not higher than about 70 nm, not higher than about 60 nm, or not higher than about 50 nm. In various embodiments, the nanoparticles have an average particle size (e.g., diameter of spherical particles) of not more than about 125 nm, e.g., not more than about 100 nm, or not more than about 75 nm. In various embodiments, the nanoparticles have an average particle size of from about 40 to about 250 nm, e.g., from about 40 to about 100 nm, from about 40 to about 60 nm, from about 100 to about 175 nm, from about 75 to about 125 nm, from about 100 to about 250 nm or from about 80 to about 140 nm. Preferably, at least about 90 percent of the nanoparticles formed have a diameter of not more than about 125 nm, e.g., not more than about 100 nm, or not more than about 75 nm. The average particle sizes and particle size distributions referred to herein may be measured by conventional methods such as, e.g., by scanning electron microscopy (SEM) or tunneling electron microscopy (TEM) and refer to the metal cores.

In yet another aspect of the process of the present invention, at least about 80 volume percent, e.g., at least about 90 volume percent of the nanoparticles formed by the processes of the present invention may be not larger than about 2 times, e.g., not larger than about 1.5 times the average particle size (volume average).

For a further description of metal nanoparticles that are coated with a polymer of vinylpyrrolidone, see U.S. patent application Ser. No. 11/331,211, filed Jan. 13, 2006, the entirety of which is incorporated herein by reference.

The reduction processes of the present invention and the optional further processing of the reaction mixture obtained thereby are capable of affording large, commercially useful quantities of substantially non-agglomerated, dispersed or redispersable metal nanoparticles in a single run. For example, in batch-wise operation the process of the present invention can be carried out on a scale at which at least about 30 g, e.g., at least about 40 g, at least about 50 g, or at least about 60 g of substantially non-agglomerated, dispersed or redispersable metal (e.g., silver) nanoparticles (expressed as pure metal without polymer of vinylpyrrolidone) are produced in a single run. In a preferred aspect, a single run will afford at least about 100 g, at least about 200 g, or at least about 500 g of substantially non-agglomerated, dispersed or redispersable metal nanoparticles.

Applications

In particular, the nanoparticles of the present invention may be used in the formulation of printing inks for various purposes and for various printing techniques such as, e.g., ink-jet printing, screen printing, intaglio printing, roll printing, lithographic printing and gravure printing. Major fields of application for these inks include electronics (e.g., for the printing of electrically conductive features and the like by, for example, ink-jet printing during the fabrication of, for example, bus bars and electrodes on solar cells and flat panel displays), graphics (e.g., decorative features having specular reflectance or otherwise having metallic reflectivity), security features (e.g., security features having specular reflectance or otherwise having metallic reflectivity) and the like. In many of these applications, the excess polymer is either acceptable or can be removed by, e.g., thermal means, for example, by heating the deposited ink to a temperature above the decomposition temperature of the polymer (which at the same time will remove the polymer that is adsorbed on the nanoparticles). The removal of excess polymer by the application of thermal energy is particularly suitable for applications which involve heat-resistant materials (substrates) such as, e.g., glass, ceramic, metal and heat-resistant polymers.

EXAMPLES

The present invention will be further illustrated by the following non-limiting examples.

Example 1

Comparative

PVP (1000 g, M.W. 10,000, ISP) was weighed into a tray. The PVP was, depending on the Sample, either heated at 70° C. for 15 hr, or not heated at all prior to mixing with ethylene glycol. After cooling (for heated runs) to room temperature, the PVP was transferred into a 4-L Erlenmeyer flask. Ethylene glycol (2.5 L) was added to the flask. The mixture was then shear mixed until completely dissolved at room temperature which gradually increased to 50-60° C. due to mechanical and shear friction energy transfer to the polymer and solvent.

In a separate beaker, silver nitrate (128 g) was weighed. Ethylene glycol (500 mL) was added to the beaker. The mixture was then rapidly stirred on a magnetic stirrer until complete dissolution of the silver nitrate.

The PVP solution was stirred using a mechanical, overhead mixer while heating to 120° C. The silver nitrate solution was then rapidly added to the PVP solution, at which point the temperature of the combined solutions dropped to between 108 and 114° C.

The temperature of the solution was allowed to return to 120° C. and stabilized at this temperature for about 60 to 100 minutes. The reaction mixture was allowed to cool to room temperature. The reaction mixture was allowed to cool to room temperature and about 200 mL of ethylene glycol were added thereto to replace evaporated ethylene glycol. The resultant mixture was transferred to a mixing tank where 9 L of acetone and about 1 L of ethylene glycol were added. The mixture was stirred thoroughly and then transferred to a centrifuge where it was centrifuged for about 10 minutes at 2,200 rpm to separate the silver nanoparticles from the liquid phase. This afforded nanoparticles having PVP adsorbed thereon. The particles were subsequently suspended in 500 mL of ethanol to remove, inter alia, excess PVP that was not adsorbed on the nanoparticles but was present merely as a contaminant. The suspension was subsequently centrifuged and the resulting cake was dried in a vacuum oven at about 35° C. and about $10^{-2}$ torr to afford dry nanoparticles. Three samples were run, two employing PVP from a first PVP lot, and the other employing PVP from a second PVP lot.

Figure 3:
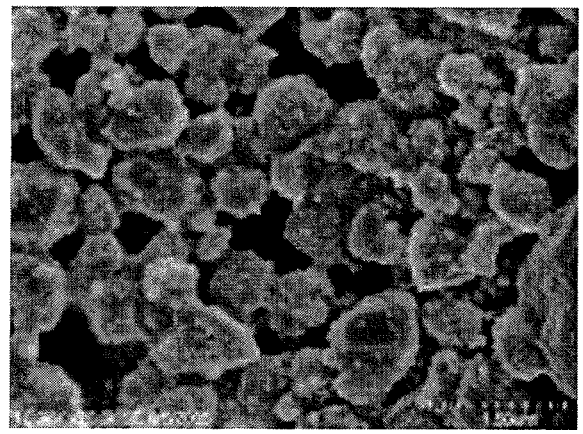
FIG. 3 presents a SEM of the nanoparticles formed according to Comparative Example 1, lot 3, in which the PVP was not heated before the reacting, and showing irregularly shaped particles having a broad particle size distribution.
Figure 4:
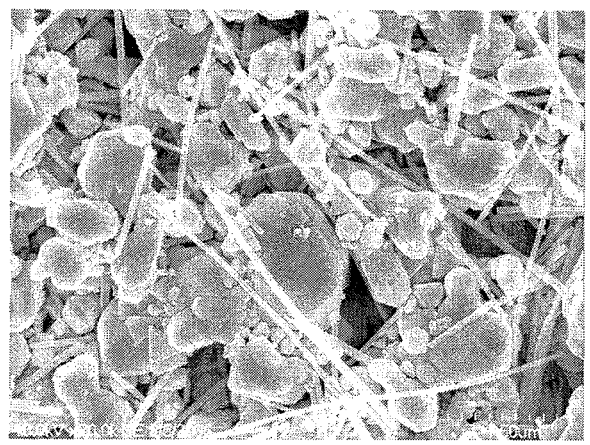
FIG. 4 presents a SEM of another batch of nanoparticles formed according to Comparative Example 1, lot 4, in which the nanoparticles comprise a large number of different sizes, irregular particles, chunks, rods, long wires, agglomerates, aggregates of agglomerates and other shapes.

Five samples were run, two employing PVP from a first PVP lot, and the other three employing PVP from various different PVP lots. The particles were characterized by TGA, He Pycnometry, quasi elastic light scattering and SEM (Table 1). The SEM in FIG. 3 is for Sample B (showing irregularly shaped particles and broad PSD), and the SEM in FIG. 4 is for Sample E (showing irregularly shaped particles, chunks, rods, wires, agglomerates, aggregates of agglomerates).

of powder batches that in addition to quasi spherical nanoparticles at about 50 nm may comprise in large numbers at different sizes irregular particles, chunks, rods, long wires, agglomerates, aggregates of agglomerates and other shapes (FIG. 4). TGA weight loss data and density measurements in a first approximation inversely correlate with each other and may serve as indirect indications for the size and compositional ratios of the nanoparticles.

Example 2

Effect of PVP heating

PVP containing between 0.1 and 1 wt. % formate (63 g, M.W. 10,000, ISP) was weighed into a 500 mL beaker. The PVP was then heated at 100° C. for 70-90 hr. After cooling to room temperature, ethylene glycol (157 g) was added to the beaker. The mixture was then shear mixed for 10-30 min. at room temperature.

In a separate beaker, silver nitrate (8 g) was weighed. Ethylene glycol (31 g) was added to the beaker. The mixture was then rapidly stirred on a magnetic stirrer until complete dissolution of the silver nitrate.

The PVP solution was stirred at 300 RPM using a mechanical, overhead mixer while heating to 120° C. The silver nitrate solution was then rapidly added to the PVP solution, at which point the temperature of the combined solutions dropped to between 108 and 114° C.

The temperature of the solution was allowed to return to 120° C. and stabilized at this temperature for about 60 to 100 minutes. The reaction mixture was allowed to cool to room temperature. The resultant mixture was transferred to a mixing tank where about 0.8 L of acetone and about 60 mL of ethylene glycol were added. The mixture was stirred thoroughly and then transferred to a centrifuge where it was centrifuged for about 20 minutes at 1,500 g to separate the silver nanoparticles from the liquid phase. This afforded nanoparticles having PVP adsorbed thereon. The particles were subsequently suspended in 25 mL of ethanol to remove, inter alia, excess PVP that was not adsorbed on the nanoparticles but was present merely as a contaminant. The suspension was subsequently centrifuged and the resulting cake was

TABLE 1

| Sample ID | PVP lot | PVP heating [° C., hrs] | AgNO$_3$ to Ag conversion [%] | TGA weight loss [wt. %] at 600° C. | Density [g/cm$^3$] | Z-Average [nm] | Diameter by volume [nm] | % by volume |
|---|---|---|---|---|---|---|---|---|
| A | 1 | None | 97 | 3.1 | 8.6 | 110 | 8-Peak 1 | 90 |
|   |   |      |    |     |     |     | 39-Peak 2 | 6 |
|   |   |      |    |     |     |     | 316-Peak 3 | 4 |
| B[†] | 2 | None | 95 | 3.3 | 8.5 | 88 | 36-Peak 1 | 15 |
|   |   |      |    |     |     |     | 226-Peak 2 | 103 |
| C | 1 | 70, 15 | 100 | 3.5-3.6 | 8.4 | 152 | 18-Peak 1 | 75 |
|   |   |      |    |     |     |     | 506-Peak 2 | 25 |
| D | 3 | None | 96 | 2.6 | 8.9 | 75 | 32-Peak 1 | 87 |
|   |   |      |    |     |     |     | 201-Peak 2 | 12 |
| E[††] | 4 | None | 34 | 1.5-1.6 | 8.9-9.8 | 720 | 33-Peak 1 | 4 |
|   |   |      |    |     |     |     | 2392-Peak 2 | 96 |

[†] = See FIG. 3.
[††] = See FIG. 4.

Figure 2:
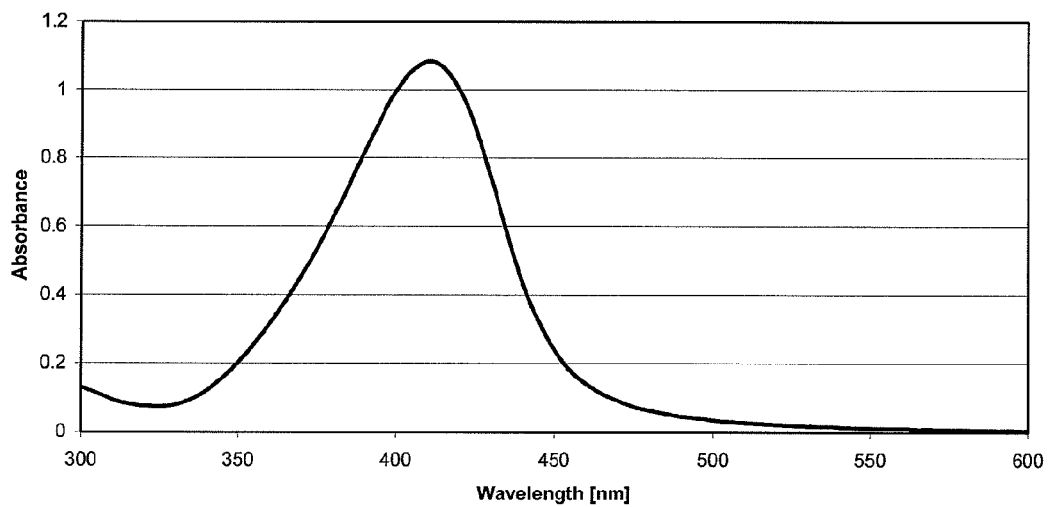
FIG. 2 presents UV-VIS plot of absorbance as a function of wavelength for the nanoparticles formed in Sample G of Example 2.

The skilled artisan will appreciate that depending on the PVP lots used above, the reactions led to erratic results as far as reaction kinetics and particle quality. While in some cases particle quality was acceptable, in others particle quality varied over a wide range which manifested itself in the formation dried in a vacuum oven at about 35° C. and about $10^{-2}$ torr to afford dry nanoparticles. Eight samples were run, each employing a different PVP lot. The particles were characterized by TGA, quasi elastic light scattering (Table 2), SEM (FIG. 1) and UV-VIS (FIG. 2). FIGS. 1 & 2 are for Sample G.

TABLE 2

| Sample ID | PVP lot | PVP heating [hrs] | TGA weight loss [wt. %] at 600° C. | Z-Average [nm] | Diameter by volume (Width) [nm] | % by volume |
|---|---|---|---|---|---|---|
| F | 4 | 71 | 7.6 | 50 | 34(16) | 100 |
| G† | 3 | 88 | 8.4 | 39 | 28(10) | 100 |
| H | 5 | 93 | 8.0 | 40 | 28(10) | 100 |
| I | 2 | 85 | 8.2 | 43 | 30(11) | 100 |
| J | 6 | 87 | 4.1 | 56 | 16(10) - Peak 1 | 99 |
|   |   |   |   |   | 177(63) - Peak 2 | 1 |
| K | 5 | 72 | 9.1 | NM | NM | NM |
| L | 7 | 72 | 8.5 | NM | NM | NM |
| M | 8 | 72 | 8.8 | NM | NM | NM |

NM = not measured
† = See FIGS. 1 & 2

Example 3

Effect of PVP heating and Employing a Non-Polyol Reducing Agent in the First Solution PVP containing about 0.6 wt. % formate (63 g, M.W. 10,000, ISP) was weighed into a 500 mL beaker. The PVP was then heated at 100° C. for 70 hr. After cooling to room temperature the formate content was determined to be 0.04 wt. %. Ethylene glycol (157 g) was added to the beaker. The mixture was then shear mixed for 15 min. at room temperature.

In a separate beaker, silver nitrate (8 g) was weighed. Ethylene glycol (31 g) was added to the beaker. The mixture was then rapidly stirred on a magnetic stirrer until complete dissolution of the silver nitrate.

The PVP solution was stirred at 300 RPM using a mechanical, overhead mixer while heating to 120° C. 0.19 g (0.35 wt. % based on PVP) formic acid was added to the solution. After 3 minutes the silver nitrate solution was then rapidly added to the PVP solution, at which point the temperature of the combined solutions dropped to 111° C.

The temperature of the solution was allowed to return to 120° C. and stabilized at this temperature for about 85 minutes. The reaction mixture was allowed to cool to room temperature. The resultant mixture was transferred to a mixing tank where about 0.8 L of acetone and about 60 mL of ethylene glycol were added. The mixture was stirred thoroughly and then transferred to a centrifuge where it was centrifuged for about 20 minutes at 1,500 g to separate the silver nanoparticles from the liquid phase. This afforded nanoparticles having PVP adsorbed thereon. The particles were subsequently suspended in 25 mL of ethanol to remove, inter alia, excess PVP that was not adsorbed on the nanoparticles but was present merely as a contaminant. The suspension was subsequently centrifuged and the resulting cake was dried in a vacuum oven at about 35° C. and about $10^{-2}$ torr to afford dry nanoparticles. The particles as characterized by TGA exhibited a weight loss of about 7.5 wt. % when heated to 600° C.

Example 4

Effect of PVP heating, larger scale

PVP (1000 g, M.W. 10,000, ISP) was weighed into a tray. The PVP was then heated at 100° C. for 72 hr. After cooling to room temperature the PVP was transferred into a 4-L Erlenmeyer flask. Ethylene glycol (2.5 L) was added to the flask. The mixture was then shear mixed until completely dissolved at room temperature which gradually increased to 50-60° C. due to mechanical and shear friction energy transfer to the polymer and solvent.

In a separate beaker, silver nitrate (128 g) was weighed. Ethylene glycol (500 mL) was added to the beaker. The mixture was then rapidly stirred on a magnetic stirrer until complete dissolution of the silver nitrate.

The PVP solution was stirred using a mechanical, overhead mixer while heating to 120° C. The silver nitrate solution was then rapidly added to the PVP solution, at which point the temperature of the combined solutions dropped to between 108 and 114° C.

The temperature of the solution was allowed to return to 120° C. and stabilized at this temperature for about 60 to 100 minutes. The reaction mixture was allowed to cool to room temperature. The reaction mixture was allowed to cool to room temperature and about 200 mL of ethylene glycol were added thereto to replace evaporated ethylene glycol. The resultant mixture was transferred to a mixing tank where 9 L of acetone and about 1 L of ethylene glycol were added. The mixture was stirred thoroughly and then transferred to a centrifuge where it was centrifuged for about 10 minutes at 2,200 rpm to separate the silver nanoparticles from the liquid phase. This afforded nanoparticles having PVP adsorbed thereon. The particles were subsequently suspended in 500 mL of ethanol to remove, inter alia, excess PVP that was not adsorbed on the nanoparticles but was present merely as a contaminant. The suspension was subsequently centrifuged and the resulting cake was dried in a vacuum oven at about 35° C. and about $10^{-2}$ torr to afford dry nanoparticles. Three samples were run, two employing PVP from a first PVP lot, and the other employing PVP from a second PVP lot. The particles were characterized by TGA, He Pycnometry, quasi elastic light scattering and large particle count (LPC) (Table 3).

TABLE 3

| Sample ID | PVP lot | PVP heating [hrs] | TGA weight loss [wt. %] at 600° C. | Density [g/cm³] | Z-Average [nm] | Diameter by volume [nm] | % by volume | LPC # >0.56 um per 0.1 mL |
|---|---|---|---|---|---|---|---|---|
| N | 3 | 72 | 8.2 | 6.8 | 40 | 57 - Peak 1 | 93 | 158,386 |
|   |   |   |   |   |   | 5 - Peak 2 | 7 |   |

TABLE 3-continued

| Sample ID | PVP lot | PVP heating [hrs] | TGA weight loss [wt. %] at 600° C. | Density [g/cm³] | Z-Average [nm] | Diameter by volume [nm] | % by volume | LPC # >0.56 um per 0.1 mL |
|---|---|---|---|---|---|---|---|---|
| O | 4 | 72 | 7.6 | 6.9 | 54 | 73 | 100 | 47,700 |
| P | 3 | 72 | 7.3 | 6.8 | 50 | 65 | 100 | 43,249 |

Example 5

Effect of Longer PVP Heating

PVP containing between 0.1 and 1 wt. % formate (63 g, M.W. 10,000, ISP) was weighed into a 500 mL beaker. The PVP was then heated at 100° C. for 144 hr. After cooling to room temperature, ethylene glycol (157 g) was added to the beaker. The mixture was then shear mixed for 10-30 min. at room temperature In a separate beaker, silver nitrate (8 g) was weighed. Ethylene glycol (31 g) was added to the beaker. The mixture was then rapidly stirred on a magnetic stirrer until complete dissolution of the silver nitrate.

The PVP solution was stirred at 300 RPM using a mechanical, overhead mixer while heating to 120° C. The silver nitrate solution was then rapidly added to the PVP solution, at which point the temperature of the combined solutions dropped to between 108 and 114° C.

The temperature of the solution was allowed to return to 120° C. and stabilized at this temperature for about 60 to 100 minutes. The reaction mixture was allowed to cool to room temperature. The resultant mixture was transferred to a mixing tank where about 0.8 L of acetone and about 60 mL of ethylene glycol were added. The mixture was stirred thoroughly and then transferred to a centrifuge where it was centrifuged for about 20 minutes at 1,500 g to separate the silver nanoparticles from the liquid phase. This afforded nanoparticles having PVP adsorbed thereon. The particles were subsequently suspended in 25 mL of ethanol to remove, inter alia, excess PVP that was not adsorbed on the nanoparticles but was present merely as a contaminant. The suspension was subsequently centrifuged and the resulting cake was dried in a vacuum oven at about 35° C. and about $10^{-2}$ torr to afford dry nanoparticles. Two samples were run, each employing PVP from a different PVP lot. The particles were characterized by TGA and Helium pycnometry (Table 4).

TABLE 4

| Sample ID | PVP lot | PVP heating [hrs] | TGA weight loss [wt. %] at 600° C. | Density [g/cm³] |
|---|---|---|---|---|
| Q | 2 | 144 | 11.4 | 5.5 |
| R | 3 | 144 | 11.2 | 5.6 |

Example 6

Effect of PVP Heating, PVP/AgNO₃ Ratio and Reaction Temperature

PVP containing between 0.1 and 1 wt. % formate (63 g, M.W. 10,000, ISP) was weighed into a 1-L beaker. The PVP was then heated at 100° C. for 72-93 hr. After cooling to room temperature, ethylene glycol (312 g or 471 g) was added to the beaker. The mixture was then shear mixed for 10 min. at room temperature In a separate beaker, silver nitrate (16 g or 24 g) was weighed. Ethylene glycol (62 g or 93 g) was added to the beaker. The mixture was then rapidly stirred on a magnetic stirrer until complete dissolution of the silver nitrate.

The PVP solution was stirred at 300 RPM using a mechanical, overhead mixer while heating to 110-130° C. The silver nitrate solution was then rapidly added to the PVP solution, at which point the temperature of the combined solutions dropped by between 5 and 12° C.

The temperature of the solution was allowed to return to 110-130° C. and stabilized at this temperature for about 60 to 100 minutes. The reaction mixture was allowed to cool to room temperature. The resultant mixture was transferred to a mixing tank where about 0.8 L of acetone and about 60 mL of ethylene glycol were added. The mixture was stirred thoroughly and then transferred to a centrifuge where it was centrifuged for about 20 minutes at 1,500 g to separate the silver nanoparticles from the liquid phase. This afforded nanoparticles having PVP adsorbed thereon. The particles were subsequently suspended in 25 mL of ethanol to remove, inter alia, excess PVP that was not adsorbed on the nanoparticles but was present merely as a contaminant. The suspension was subsequently centrifuged and the resulting cake was dried in a vacuum oven at about 35° C. and about $10^{-2}$ torr to afford dry nanoparticles. Four samples were run, each with the same PVP. The particles were characterized by TGA and Helium pycnometry (Table 5).

The reaction when carried out at 110° C. for up to 120 minutes resulted in incomplete conversion of silver nitrate to Ag nanoparticles, the yield of recovered nanoparticles being between 10 and 20%.

TABLE 5

| Sample ID | PVP lot | PVP heating [hrs] | PVP/AgNO₃ ratio (w/w) | Reaction temperature [° C.] | TGA weight loss [wt. %] at 600° C. | Density [g/cm³] |
|---|---|---|---|---|---|---|
| S | 5 | 93 | 3.9 | 120 | 4.9 | NM |
| T | 5 | 72 | 2.6 | 120 | 2.9 | 8.7 |
| U | 5 | 72 | 2.6 | 130 | 3.1 | 8.6 |
| V | 5 | 72 | 2.6 | 110 | 17.4 | NM |

NM = not measured

The particles were then formulated into inks and the inks were deposited onto a glass substrate where they dried and were post heat-treated in an oven under ambient conditions for various amounts of time and temperature. After cooling, the electrical conductivity was measured and is presented in Table 6.

TABLE 6

| Sample ID | 300° C., 30 min [x bulk Ag ρ] |
|---|---|
| S | 6.30 |
| T | 1.66 |
| U | 1.81 |
| V | 6.60 |

Example 7

Comparative

PVP (1000 g, M.W. 10,000, BASF) was weighed into a 4-L beaker. Ethylene glycol (2.5 L) was added to the beaker. The mixture was then shear mixed until completely dissolved at room temperature which gradually increased to from 50 to 60° C. due to mechanical and shear friction energy transfer to the polymer and solvent.

In a separate beaker, silver nitrate (128 g) was weighed. Ethylene glycol (500 mL) was added to the beaker. The mixture was then rapidly stirred on a magnetic stirrer until complete dissolution of the silver nitrate.

The PVP solution was transferred to a 4-L Erlenmeyer flask and stirred using a mechanical, overhead mixer. The solution was heated to 120° C. The silver nitrate solution was then rapidly added to the PVP solution, at which point the temperature of the combined solutions dropped to less than 120° C.

After the temperature of the solution was allowed to return to 120° C. due to the exothermic nature of the reaction occurring therein, the mixture was maintained at 120° C. for about 60 minutes. The reaction mixture was then allowed to cool to room temperature and about 200 mL of ethylene glycol was added thereto to replace evaporated ethylene glycol. The resultant mixture was transferred to a mixing tank where 9 L of acetone and about 1 L of ethylene glycol were added. The mixture was stirred thoroughly and then transferred to a centrifuge where it was centrifuged for about 10 minutes at 3,000 rpm to separate the silver nanoparticles from the liquid phase. This afforded silver nanoparticles having PVP adsorbed thereon. The particles were subsequently suspended in about 500 mL of ethanol to remove, inter alia, excess PVP that was not adsorbed on the nanoparticles but was present merely as a contaminant. The suspension was subsequently centrifuged and the resulting cake was dried in a vacuum oven at about 35° C. and about $10^{-2}$ torr to afford dry nanoparticles. After separation and isolation the silver particles exhibited a TGA weight loss of between 0.8 and 0.9 wt. % and a density as measured by Helium pycnometry of between 10.0 and 10.2 g/cm$^3$. The z-average particle size of the particles produced in the reaction described above as measured by quasi elastic light scattering (Malvern Instruments) was between 100 and 200 nm. Size statistics by volume showed multimodal size distributions with main peaks centered around 40 to 60 nm, 200 to 300 nm and 4200 nm. In one case more than 52% of the nanoparticles produced had a diameter of 200 to 300 nm. In another case more than 85% of the nanoparticles produced had a diameter centered around 4200 nm.

Example 8

Heating PVP and Employing a Non-Polyol Reducing Agent in the First Solution

This example describes five Ag/PVP nanoparticle syntheses where the amount of a non-polyol reducing agent in the first solution was varied between 250 mg and 1000 mg. PVP (M.W. 10,000, BASF) was weighed into a 1-L beaker. The PVP was then heated to 100° C. for 48 hr. After cooling to room temperature, ethylene glycol (684 g) was added to the beaker. Ammonium formate (250 mg to 1 g) was then added to the beaker. The mixture was then shear mixed for 30 min. at room temperature.

In a separate beaker, silver nitrate (32 g) was weighed. Ethylene glycol (133 g) was added to the beaker. The mixture was then rapidly stirred on a magnetic stirrer until the silver nitrate completely dissolved.

The PVP solution was transferred to a 1-L Erlenmeyer flask and stirred at 300 RPM using a mechanical, overhead mixer. The solution was heated to 120° C. The silver nitrate solution was then rapidly added to the PVP solution, at which point the temperature of the combined solutions dropped to less than 120° C.

After the temperature of the solution was allowed to return to 120° C. due to the exothermic nature of the reaction occurring therein, the reaction was maintained at about 120° C. for about 60 minutes. The reaction mixture was then allowed to cool to room temperature and about 50 mL of ethylene glycol was added to replace evaporated ethylene glycol. This mixture was stirred at high speed for about 30 minutes to resuspend any particles that had settled during the reaction. The resultant mixture was transferred to a mixing tank where 3 L of acetone and about 250 mL of ethylene glycol were added. The mixture was stirred thoroughly and then transferred to a centrifuge where it was centrifuged for about 20 minutes at 3,000 rpm to separate the silver nanoparticles from the liquid phase. This afforded between 16.0 and 19.4 g of nanoparticles having PVP adsorbed thereon. The particles were subsequently suspended in about 100 mL of ethanol to remove, inter alia, excess PVP that was not adsorbed on the nanoparticles but was present merely as a contaminant. The suspension was subsequently centrifuged and the resulting cake was dried in a vacuum oven at about 35° C. and about $10^{-2}$ ton to afford dry nanoparticles. These nanoparticles exhibited a TGA weight loss of about 3.0 to about 4.5 weight percent. The z-average particle size of the particles produced in the reactions described above as measured by quasi elastic light scattering (Malvern Instruments) was between 75 and 116 nm. Size statistics by volume showed bimodal or trimodal size distributions with peaks centered around 4 to 8 nm, 15 to 25 nm and 150 to 300 nm. Between 75 and 99% of the nanoparticles produced had a diameter centered around 4 to 8 nm and 15 to 25 nm. Less than about 25% of the nanoparticles had a diameter centered around 150 to 300 nm. The particles exhibited a density as measured by Helium pycnometry of between 8.1 and 8.6 g/cm$^3$. The results are summarized in Table 7.

TABLE 7

| Sample ID | Ammonium formate [mg] | TGA weight loss [wt. %] at 600° C. | Density [g/cm$^3$] | Z-Average [nm] |
|---|---|---|---|---|
| W | 250 | 3.0 | 8.6 | 76 |
| X | 500 | 4.0 | 8.3 | 76 |
| Y | 625 | 3.9 | 8.1 | 116 |
| Z | 750 | 3.8 | 8.5 | 75 |
| AA | 1000 | 4.5 | 8.5 | 89 |

The particles were then formulated into inks and the inks were deposited onto a glass substrate where they were dried and post heat treated in an oven under ambient conditions for various amounts of time and temperature (100° C. for 60 min, 120° C. for 60 min, & 300° C. for 30 min). After cooling, the electrical conductivity was measured. The results are presented in Table 8.

TABLE 8

| Sample ID | 100° C., 60 min [x bulk Ag ρ] | 120° C., 60 min [x bulk Ag ρ] | 300° C., 30 min [x bulk Ag ρ] |
|---|---|---|---|
| W | 13.31 | 4.81 | 1.62 |
| X | 19.17 | 6.35 | 2.11 |
| Y | 20.78 | 6.95 | 1.74 |
| Z | 19.4 | 6.07 | 1.43 |
| AA | 19.16 | 6.75 | 1.52 |

Example 9

Employing a Base in the First Solution

Six samples were run with two PVP lots, and various amounts of PVP and base (tetramethyl ammonium hydroxide) as shown in Table 9. Specifically, for each sample, silver nitrate (96 g) was dissolved in 415 mL ethylene glycol in a beaker to make a silver nitrate/ethylene glycol solution. PVP (375-760 g) was dissolved in 2 L ethylene glycol in a separate beaker. The resulting PVP/ethylene glycol solution was transferred to a 4 L liter Erlenmeyer flask. The Erlenmeyer flask was equipped with an over-head stirring apparatus and a gas dispersion tube. Air was bubbled vigorously through the PVP/ethylene glycol solution for all samples except Samples DD and EE. The PVP/ethylene glycol solution was heated at a rate of 60° C./hour up to 120° C. When the reaction reached 60° C., tetramethylammonium hydroxide (mole ratio to Ag:0.22-0.5) was added to all samples except Sample BB. Once the reaction reached 120° C., the silver nitrate/ethylene glycol solution was rapidly poured into the PVP/ethylene glycol solution in 5 seconds. The reaction temperature was maintained at 120° C. for 1 hr. After 1 hr elapsed, the reaction was allowed to cool to room temperature. For samples BB, CC, FF & GG, air was bubbled through the reaction up to the point where the reaction reached room temperature. The nanoparticles that were produced were collected in the same manner described in Example 8. The nanoparticles produced when base was used exhibited an organic content of about 5 to about 8 weight percent. More than 90% of the nanoparticles produced in the reaction described above had an average diameter of less 50 nm.

Six samples were run, four (Samples BB-EE) with a first PVP lot (lot 7), and two (Samples FF, GG) with another PVP lot (lot 9). The characterization data are listed in Table 9.

TABLE 9

| Sample ID | PVP lot | PVP Amount [g] | TMAH[a] amount [mol % based on Ag] | TGA weight loss (wt %) at 600° C. | Density [g/cm$^3$] | Z-Average [nm] | Diameter by volume [nm] | % by volume |
|---|---|---|---|---|---|---|---|---|
| BB[b] | 7 | 375 | None | 2.2 | 9.2 | 71 | 40.6 | 91 |
|  |  |  |  |  |  |  | 159 | 9 |
| CC[b] | 7 | 750 | 0.44 | N/A | N/A | 49 | 27 | 4 |
|  |  |  |  |  |  |  | 5 | 96 |
| DD | 7 | 500 | 0.22 | 6.2 | 7.6 | N/A[c] | N/A | N/A |
| EE | 7 | 375 | 0.50 | 6.2 | 7.2 | 57 | 37 | 100 |
| FF[b] | 9 | 375 | 0.22 | 5.2 | 7.8 | 50 | 32 | 97 |
|  |  |  |  |  |  |  | 5.1 | 3 |
| GG[b] | 9 | 375 | 0.22 | 5.0 | 7.6 | 45 | 31 | 97 |
|  |  |  |  |  |  |  | 5.0 | 3 |

[a]Tetra-methyl ammonium hydroxide
[b]Reaction was performed with air purge into the reaction solution.
[c]Ag product quality in terms of size control was confirmed by large particle count (LPC).

Example 10

Large Scale Production of Metal Nanoparticles With N$_2$ Purging

AgNO$_3$ dissolved in ethylene glycol was reduced to Ag nanoparticles in the presence of PVP (also dissolved in EG) at approximately 120° C. over 90-120 min. The PVP "capped" the silver nanoparticles as they formed, enabling the production of a highly mono-disperse, size-controlled silver nanoparticles with particle diameters of ~30-90 nm. The reaction was run with N$_2$ purging. In one mixing vessel, PVP (5,354 g) was dissolved in 14,900 g ethylene glycol under agitation (250 to 330 rpm). The resulting solution was heated to 100-120° C. In a separate mixing vessel, AgNO$_3$ (685 g) was dissolved under agitation (600 rpm) in 3,000 g ethylene glycol at ambient temperature. After the two reactants were completely dissolved in the two separate vessels, and the PVP/ethylene glycol solution was at temperature, the reagents from each vessel were combined in one of two ways.

Two large scale examples were performed, each with a different mixing technique. In one example, the reagent solutions were combined by transferring the PVP/ethylene glycol solution into the reaction vessel at 100° C. and continuing to heat the PVP/ethylene glycol solution in the reaction vessel to 120° C. Once the PVP/ethylene glycol solution was at temperature in the reaction vessel, the AgNO$_3$/ethylene glycol solution was quickly pumped into reaction vessel (less than 17 seconds) and the reaction was allowed to proceed pseudo-adiabatically for 90-120 mins. In the other example, the reagent solutions were combined in a static mixer before they reached the reaction vessel. Once the PVP/ethylene glycol solution was pre-heated to 120° C. and the AgNO$_3$ was completely dissolved, the two reagent solutions were pumped in a ratio-controlled fashion (ratio of AgNO$_3$ solution flow rate to PVP solution flow rate of 0.181) into the reaction vessel via that static mixer over 6-8 mins. The reaction was allowed to proceed pseudo-adiabatically for 90-120 mins.

It is noted that the foregoing examples have been provided merely for the purpose of explanation and are in no way to be construed as limiting of the present invention. While the present invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

What is claimed is:

1. A process for the production of metal nanoparticles, wherein the process comprises mixing (a) a heated first solution comprising a polyol, a non-polyol reducing agent and a polymer of vinyl pyrrolidone; with (b) a second solution comprising a metal precursor that is capable of being reduced to a metal, wherein the non-polyol reducing agent is selected from the group consisting of ammonium formate, formic acid, formaldehyde, acetaldehyde and propionaldehyde, and the nonpolyol reducing agent employed in the first solution is from about 0.2 to about 10% by weight of the polymer of vinylpyrrolidone.

2. The process of claim 1, wherein the second solution further comprises the polyol.

3. The process of claim 2, wherein the resulting mixture is heated to a temperature from about 110° C. to about 130° C.

4. The process of claim 2, wherein the process further comprises the steps of
heating a powder of the polymer of vinylpyrrolidone to a temperature from about 70° C. to about 120° C.; and
forming the first solution from the powder, the non-polyol reducing agent, and the polyol.

5. The process of claim 4, wherein the temperature is sustained for from about 12 hours to about 150 hours.

6. The process of claim 1, wherein the heated first solution has a temperature of from about 110° C. to about 130° C.

7. The process of claim 1, wherein the metal comprises a transition metal.

8. The process of claim 7, wherein the transition metal is selected from the group consisting of gold, silver, copper, nickel, cobalt, palladium, platinum, iridium, osmium, rhodium, ruthenium, rhenium, vanadium, chromium, manganese, niobium, molybdenum, tungsten, tantalum, iron and cadmium.

9. The process of claim 1 wherein the metal comprises gold, copper or nickel.

10. The process of claim 1 wherein the metal comprises silver.

11. The process of claim 1 wherein the metal precursor comprises a salt of an inorganic acid.

12. The process of claim 11, wherein the metal precursor comprises a nitrate.

13. The process of claim 1 wherein the metal precursor comprises a salt of an organic acid.

14. The process of claim 13, wherein the metal precursor comprises an acetate or trifluoroacetate.

15. The process of claim 1 wherein the metal precursor comprises at least one of silver nitrate, silver acetate, silver trifluoroacetate, silver oxide, copper oxide, copper hydroxide, copper sulfate, nickel oxide, nickel hydroxide, nickel chloride, nickel sulfate, nickel acetate, cobalt oxide, cobalt hydroxide, cobalt chloride or cobalt sulfate.

16. The process of claim 1 wherein the polyol comprises ethylene glycol.

17. The process of claim 1 wherein the polyol comprises propylene glycol.

18. The process of claim 1 wherein the polyol comprises one or more of ethylene glycol, diethylene glycol, triethylene glycol, tetraethylene glycol, propylene glycol, dipropylene glycol, 1,3-propanediol, 1,2-butanediol, 1,3-butanediol, 1,4-butanediol, 2,3-butanediol, glycerol, trimethylolpropane, triethanolamine and trihydroxymethylaminomethane.

19. The process of claim 1 wherein the polymer of vinyl pyrrolidone comprises a vinyl pyrrolidone homopolymer.

20. The process of claim 1 wherein the polymer has a weight average molecular weight of from about 5,000 to about 100,000.

21. The process of claim 1 wherein the polymer has a weight average molecular weight of from about 5,000 to about 15,000.

22. The process of claim 1 wherein the polymer has a weight average molecular weight of from about 40000 to about 60000.

23. The process of claim 1 wherein the non-polyol reducing agent comprises ammonium formate.

24. The process of claim 1 wherein the non-polyol reducing agent comprises formic acid.

25. The process of claim 1 wherein the non-polyol reducing agent is present in the first solution in an amount from about 0.3 to about 2 wt.%.

26. The process of claim 1 wherein at least about 90% of the nanoparticles are of a substantially spherical shape.

27. The process of claim 1 wherein at least about 90% of the nanoparticles have a diameter of not more than about 125 nm.

28. The process of claim 1 wherein at least about 90% of the nanoparticles have a diameter of not more than about 100 nm.

29. The process of claim 1 wherein at least about 90% of the nanoparticles have a diameter of not more than about 75 nm.

30. The process of claim 1 wherein the mixing comprises introducing the second solution into the first solution.

31. The process of claim 1 wherein the mixing occurs in a static mixer.

32. The process of claim 1 wherein the process further comprises at least one of purging or sparging the resulting mixture.

33. The process of claim 32, wherein said at least one of purging or sparging comprises purging or sparging with an inert gas.

34. The process of claim 32, wherein said at least one of purging or sparging comprises purging or sparging with oxygen gas.

35. The process of claim 32, wherein said at least one of purging or sparging comprises purging or sparging with air.

36. The process of claim 1 wherein the volume ratio of the first solution to the second solution is from about 3:1 to about 5:1.

37. The process of claim 1 wherein the metal nanoparticles comprise a core comprising a first metal and a shell surrounding said core, wherein said shell comprises a second metal and wherein said first metal is different from said second metal.

38. A process for the production of metal nanoparticles, wherein the process comprises:
(a) heating a powder of a polymer of vinylpyrrolidone to a temperature from about 70° C. to about 120° C.;
(b) forming a heated first solution comprising the powder, and a polyol and a non-polyol reducing agent selected from the group consisting of ammonium formate, formic acid, formaldehyde, acetaldehyde and propionaldehyde; and
(c) mixing the heated first solution with a second solution comprising a metal precursor that is capable of being reduced to a metal.

39. The process of claim 38, wherein the second solution further comprises the polyol.

40. The process of claim 38, wherein the resulting mixture is heated to a temperature from about 110° C. to about 130° C.

41. The process of claim 38, wherein the powder is sustained at the temperature for from about 12 hours to about 150 hours.

42. The process of claim 38, wherein the heated first solution has a temperature of from about 110° C. to about 130° C.

43. The process of claim 38, wherein the metal comprises a transition metal.

44. The process of claim 43, wherein the transition metal is selected from the group consisting of gold, silver, copper, nickel, cobalt, palladium, platinum, iridium, osmium, rhodium, ruthenium, rhenium, vanadium, chromium, manganese, niobium, molybdenum, tungsten, tantalum, iron and cadmium.

45. The process of claim 38, wherein the metal comprises gold, copper or nickel.

46. The process of claim 38, wherein the metal comprises silver.

47. The process of claim 38, wherein the metal precursor comprises a salt of an inorganic acid.

48. The process of claim 38, wherein the metal precursor comprises a nitrate.

49. The process of claim 38, wherein the metal precursor comprises a salt of an organic acid.

50. The process of claim 49, wherein the metal precursor comprises an acetate or trifluoroacetate.

51. The process of claim 38, wherein the metal precursor comprises at least one of silver nitrate, silver acetate, silver trifluoroacetate, silver oxide, copper oxide, copper hydroxide, copper sulfate, nickel oxide, nickel hydroxide, nickel chloride, nickel sulfate, nickel acetate, cobalt oxide, cobalt hydroxide, cobalt chloride or cobalt sulfate.

52. The process of claim 38, wherein the polyol comprises ethylene glycol.

53. The process of claim 38, wherein the polyol comprises propylene glycol.

54. The process of claim 38, wherein the polyol comprises one or more of ethylene glycol, diethylene glycol, triethylene glycol, tetraethylene glycol, propylene glycol, dipropylene glycol, 1,3-propanediol, 1,2-butanediol, 1,3-butanediol, 1,4-butanediol, 2,3-butanediol, glycerol, trimethylolpropane, triethanolamine and trihydroxymethylaminomethane.

55. The process of claim 38, wherein the polymer of vinyl pyrrolidone comprises a vinyl pyrrolidone homopolymer.

56. The process of claim 38, wherein the polymer has a weight average molecular weight of from about 5,000 to about 100,000.

57. The process of claim 38, wherein the polymer has a weight average molecular weight of from about 5,000 to about 15,000.

58. The process of claim 38, wherein the polymer has a weight average molecular weight of from about 50000 to about 60000.

59. The process of claim 38, wherein first solution further comprises a base.

60. The process of claim 59, wherein the base comprises sodium hydroxide or tetramethylammonium hydroxide.

61. The process of claim 38, wherein the non-polyol reducing agent comprises ammonium formate.

62. The process of claim 38, wherein the non-polyol reducing agent comprises formic acid.

63. The process of claim 38, wherein the non-polyol reducing agent is present in the first solution in an amount from about 0.1 to about 2 wt.%.

64. The process of claim 38, wherein at least about 90% of the nanoparticles are of a substantially spherical shape.

65. The process of claim 38, wherein at least about 90% of the nanoparticles have a diameter of not more than about 125 nm.

66. The process of claim 38, wherein at least about 90% of the nanoparticles have a diameter of not more than about 100 nm.

67. The process of claim 38, wherein at least about 90% of the nanoparticles have a diameter of not more than about 75 nm.

68. The process of claim 38, wherein the mixing comprises introducing the second solution into the first solution.

69. The process of claim 38, wherein the mixing occurs in a static mixer.

70. The process of claim 38, wherein the process further comprises at least one of purging or sparging the resulting mixture.

71. The process of claim 38, wherein the volume ratio of the first solution to the second solution is from about 3:1 to about 5:1.

72. The process of claim 38, wherein the metal nanoparticles are formed into a conductive feature, and wherein the amount of the polymer of vinylpyrrolidone relative to the amount of metal precursor that is employed in the process is selected to provide a desired conductivity for the conductive feature.

* * * * *